(12) United States Patent
Pallot

(10) Patent No.: US 6,859,713 B2
(45) Date of Patent: Feb. 22, 2005

(54) METHOD AND SYSTEM FOR REGULATING A STABILITY CONTROL SYSTEM OF A VEHICLE

(75) Inventor: Patrick Pallot, Clermont-Ferrand (FR)

(73) Assignee: Michelin Recherche et Technique, Granges-Paccot (CH)

( * ) Notice: Subject to any disclaimer, the term of this patent is extended or adjusted under 35 U.S.C. 154(b) by 314 days.

(21) Appl. No.: 10/273,033

(22) Filed: Oct. 17, 2002

(65) Prior Publication Data

US 2003/0093206 A1 May 15, 2003

(30) Foreign Application Priority Data

Oct. 17, 2001 (FR) ............................................ 01 13543

(51) Int. Cl.[7] ............................ G01C 1/00; G06G 17/70
(52) U.S. Cl. .............................. 701/72; 701/41; 701/38; 303/140; 303/146; 340/440; 340/438
(58) Field of Search ............................... 701/36, 38, 41, 701/72; 303/140, 146, 139; 340/440, 438

(56) References Cited

U.S. PATENT DOCUMENTS

| | | | |
|---|---|---|---|
| 5,229,944 A | | 7/1993 | Yasuno |
| 5,548,536 A | | 8/1996 | Ammon |
| 5,852,787 A | | 12/1998 | Fodor |
| 5,964,819 A | * | 10/1999 | Naito ........................... 701/72 |
| 6,021,367 A | | 2/2000 | Pilutti |
| 6,106,081 A | | 8/2000 | Isono |
| 6,424,907 B1 | * | 7/2002 | Rieth et al. .................. 701/124 |
| 6,438,474 B1 | * | 8/2002 | Tanaka et al. ................. 701/41 |
| 6,681,180 B2 | * | 1/2004 | Bevly et al. ................. 701/213 |
| 2002/0035870 A1 | | 3/2002 | Pallot |

FOREIGN PATENT DOCUMENTS

| | | |
|---|---|---|
| DE | 39 35 588 | 4/1991 |
| DE | 44 19 131 A1 | 12/1994 |
| DE | 196 01 795 A1 | 7/1997 |
| DE | 196 23 595 A1 | 12/1997 |
| EP | 0 943 515 A1 | 9/1999 |
| GB | 2 263 180 A | 7/1993 |
| WO | WO 97/47485 | 12/1997 |
| WO | WO 01/19653 A1 | 3/2001 |

OTHER PUBLICATIONS

Abstract of EP 0 943 515.
Abstract of DE 196 01 795.
Abstract of DE 196 23 595.
Abstract of DE 39 35 588.

* cited by examiner

Primary Examiner—Thomas G. Black
Assistant Examiner—Ronnie Mancho
(74) Attorney, Agent, or Firm—E. Martin Remick; Alan A. Csontos

(57) ABSTRACT

The invention proposes a method for regulating a stability control system of a vehicle based on the forces acting at the center of each wheel of the vehicle. The actions of the driver, i.e. steering, acceleration or braking, produce forces (changes in forces) are transmitted by the tires to the ground. Control of the operating means of the vehicle (active anti-roll device, engine torque, braking torque, load per wheel or direction) utilizes instructions resulting from the actions of the driver to apply forces. The invention proposes a method of expressing, in terms of forces, the inputs of the driver as a function of the inertia of the vehicle body, velocity of forward movement of the vehicle, and angle at the steering wheel (steering wheel velocity and steering wheel acceleration). If the actual forces that are measured do not correspond to the forces desired by the driver, the active system compensates for this difference by acting on the force distributions in the chassis.

19 Claims, 21 Drawing Sheets

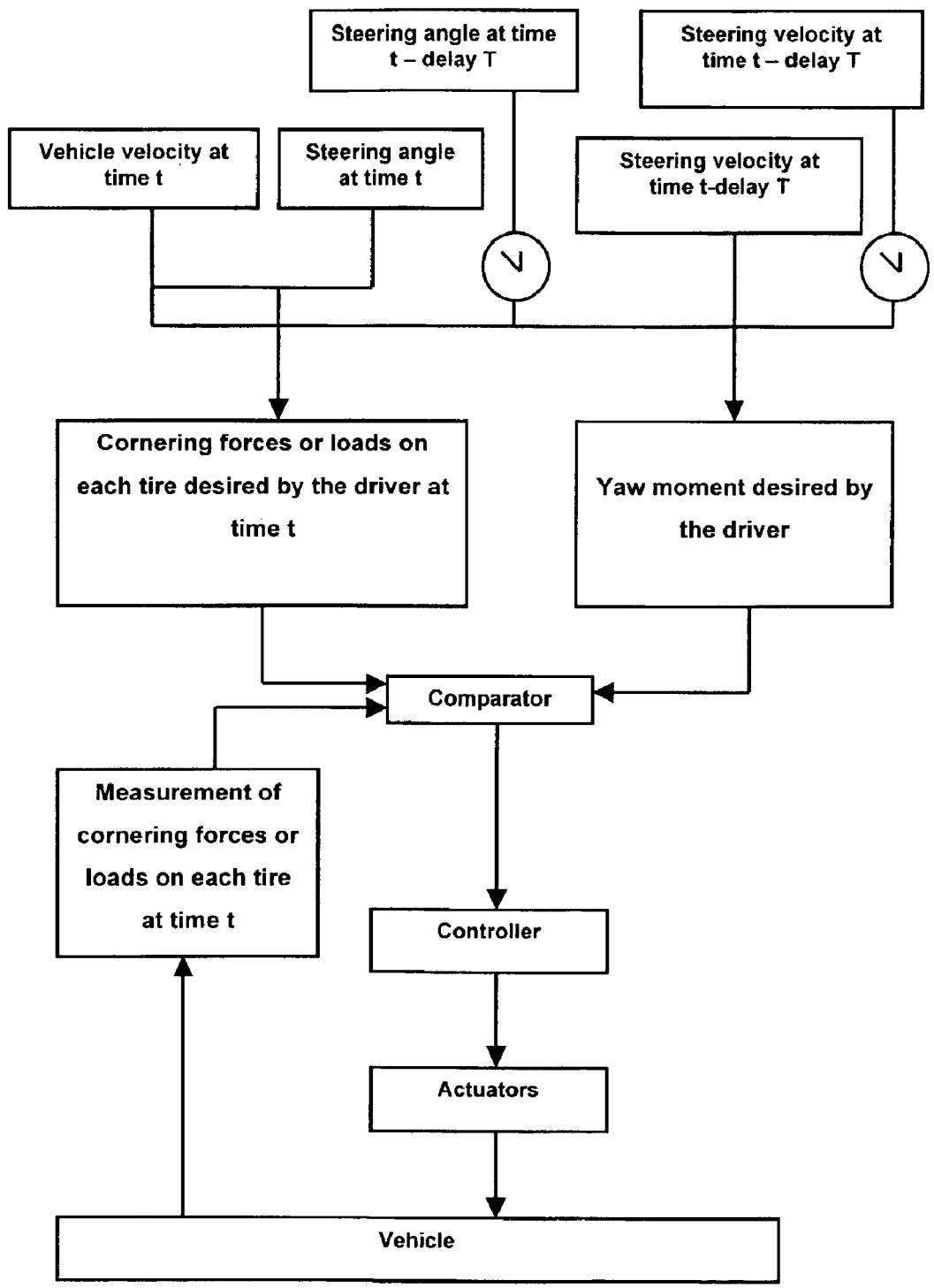

LEFT FRONT LOAD $Z_{p1}$

RIGHT FRONT LOAD $Z_{p2}$

LEFT REAR LOAD $Z_{p3}$

RIGHT REAR LOAD $Z_{p4}$

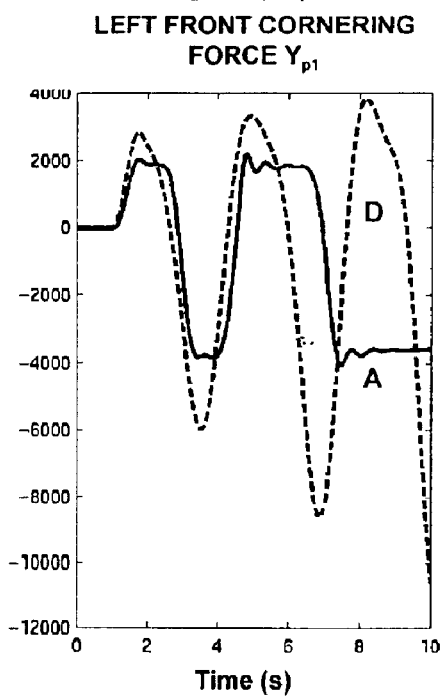
Fig 7a — LEFT FRONT CORNERING FORCE $Y_{p1}$
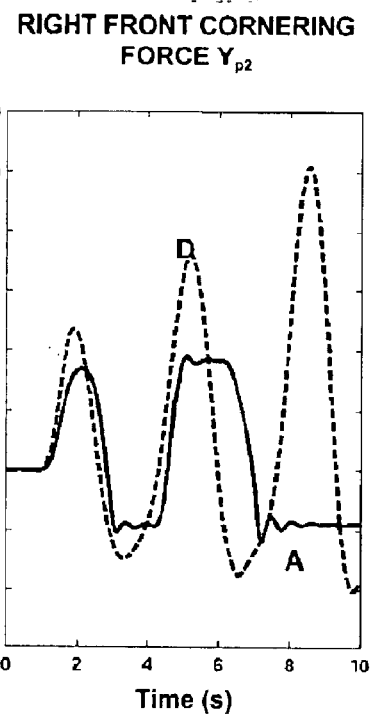
Fig 7b — RIGHT FRONT CORNERING FORCE $Y_{p2}$
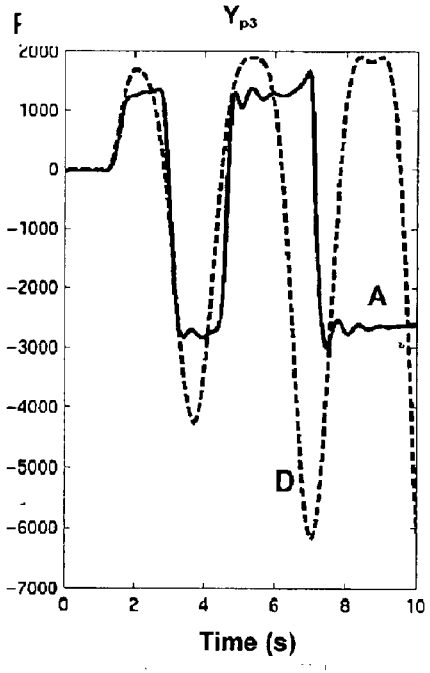
Fig 7c — LEFT REAR CORNERING FORCE $Y_{p3}$
Fig 7d — RIGHT REAR CORNERING FORCE $Y_{p4}$ LEFT FRONT LOAD $Z_{p1}$ RIGHT FRONT LOAD $Z_{p2}$ LEFT REAR LOAD $Z_{p3}$ RIGHT REAR LOAD $Z_{p4}$ LEFT FRONT CORNERING FORCE $Y_{p1}$ RIGHT FRONT CORNERING FORCE $Y_{p2}$ LEFT REAR CORNERING FORCE $Y_{p3}$ RIGHT REAR CORNERING FORCE $Y_{p4}$

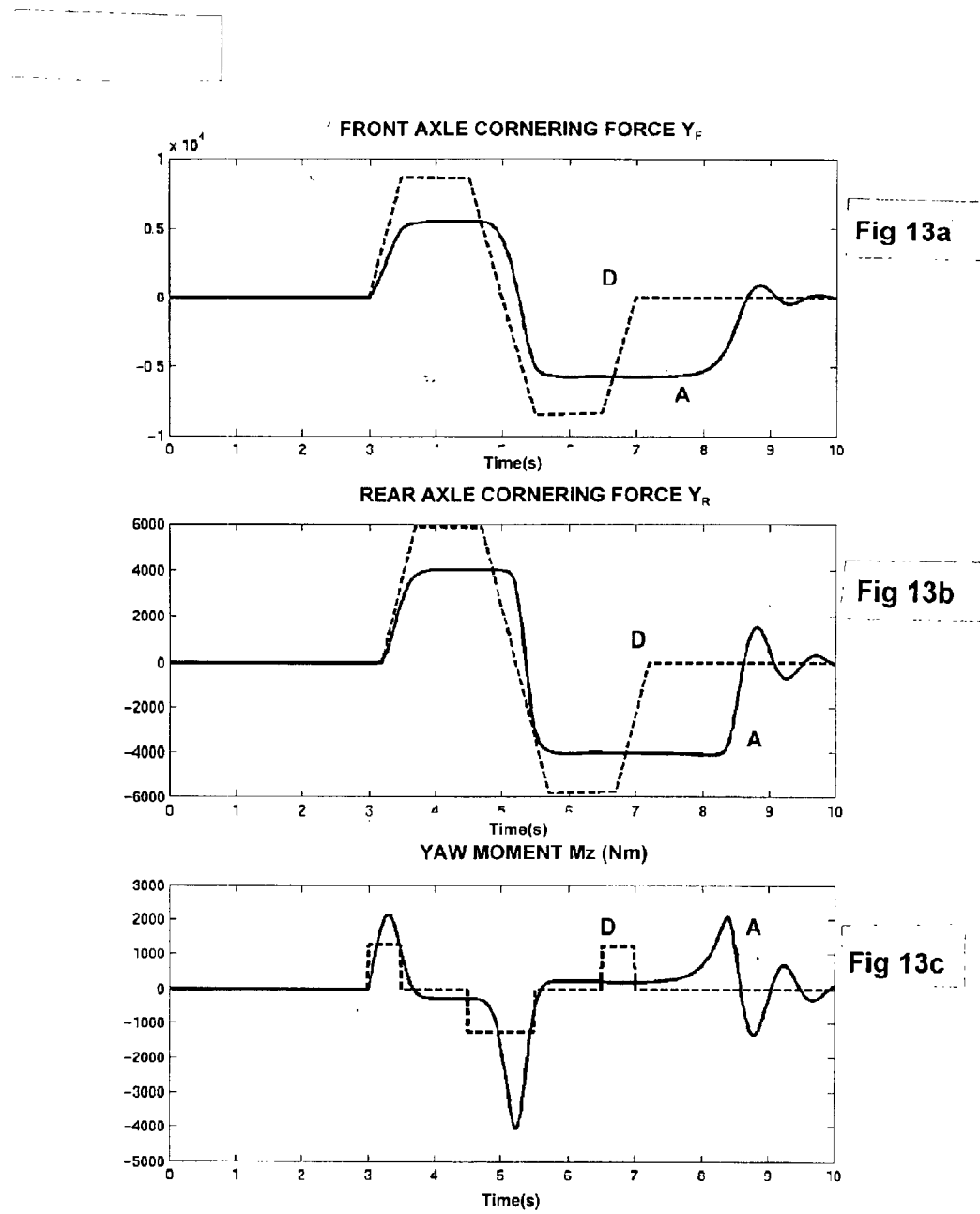

LEFT FRONT LOAD $Z_{p1}$

RIGHT FRONT LOAD $Z_{p2}$

LEFT REAR LOAD $Z_{p3}$

RIGHT REAR LOAD $Z_{p4}$

LEFT FRONT CORNERING FORCE $Y_{p1}$

RIGHT FRONT CORNERING FORCE $Y_{p2}$

LEFT REAR CORNERING FORCE $Y_{p3}$

RIGHT REAR CORNERING FORCE $Y_{p4}$

LEFT FRONT LOAD $Z_{p1}$

RIGHT FRONT LOAD $Z_{p2}$

LEFT REAR LOAD $Z_{p3}$

RIGHT REAR LOAD $Z_{p4}$

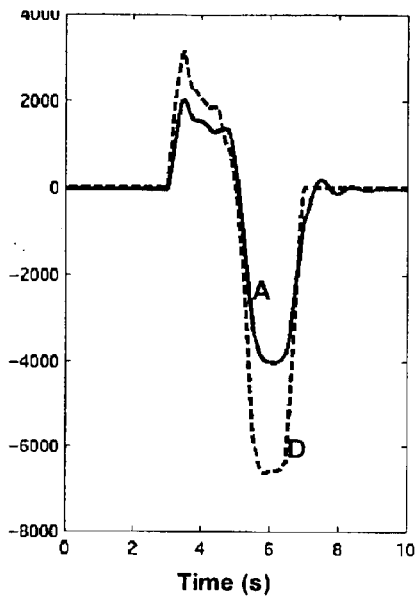
Fig 18a — LEFT FRONT CORNERING FORCE $Y_{p1}$
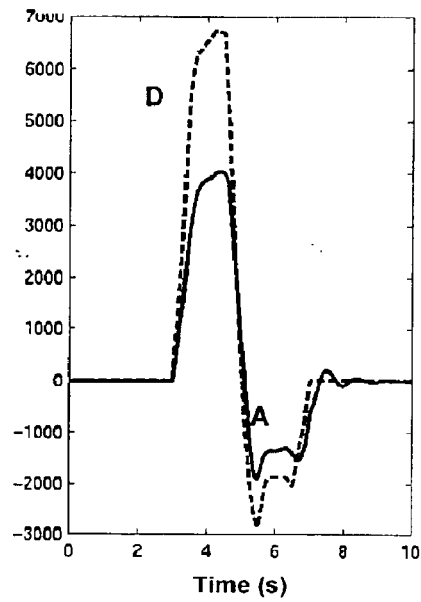
Fig 18b — RIGHT FRONT CORNERING FORCE $Y_{p2}$
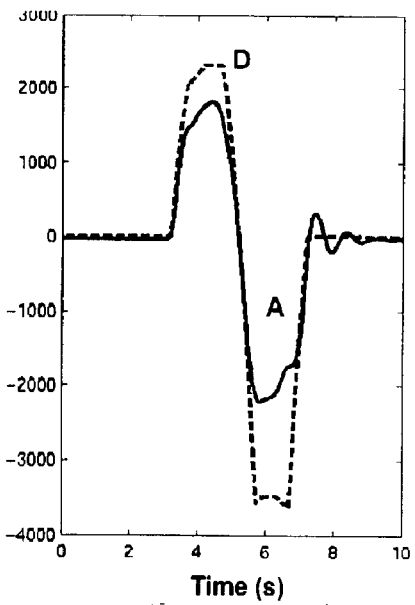
Fig 18c — LEFT REAR CORNERING FORCE $Y_{p3}$
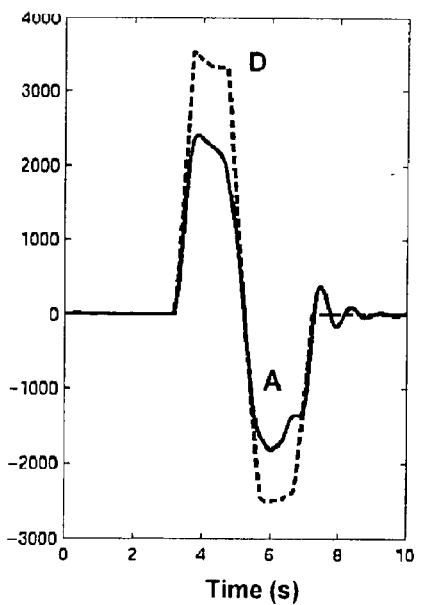
Fig 18d — RIGHT REAR CORNERING FORCE $Y_{p4}$

METHOD AND SYSTEM FOR REGULATING A STABILITY CONTROL SYSTEM OF A VEHICLE

BACKGROUND AND SUMMARY OF THE INVENTION

The present invention relates to systems for controlling the stability of a vehicle, commonly known as ESP (Electronic Stability Program) systems.

In safety systems for vehicles it is necessary to be able to assess the behavior of the vehicle in real time. This is the basis of the so-called ESP systems for controlling stability. These systems currently rely on, inter alia, monitoring movements of the vehicle by installing sensors to measure the transverse acceleration of the vehicle and the yaw rate of the vehicle.

When moving under good safety conditions, that is, when the stability of the vehicle is not compromised, the vehicle obeys the driver's commands. If the driver, basically as a result of his handling of the steering wheel, drives the vehicle beyond the limits of stability, the vehicle will exhibit oversteering or understeering. The vehicle turns, that is, performs a yaw movement, in excess of that desired by the driver (oversteering) or less than desired by the driver (understeering).

Using a mathematical model of the tire and a mathematical model of the vehicle, and based on measurements supplied by sensors recording the actions of the driver of the vehicle (angle relative to the steering wheel, application of the brakes and accelerator) and speed sensors for the wheels, and from measurements of the transverse acceleration and yaw rate, an ESP system constantly calculates the forces at the center of the wheels and estimates the grip potential of the road surface as a function of the transverse acceleration. Furthermore, the ESP system evaluates the behavior of the vehicle, compares it to the behavior desired by the driver, and corrects this behavior if it establishes that the vehicle is not moving along a stable path.

However, the use of tire models can introduce a certain number of approximations into the overall model. Furthermore, the fact that a control system is based on the displacements of the vehicle necessarily leads to a response a posteriori, which can be effective only after a delay depending on the inertia of the vehicle. It can be seen from this that an ESP system, since its variables of state include measurements of the transverse acceleration and the yaw rate of the vehicle, first of all has to measure the displacement of the vehicle before deciding whether the displacement is within the bounds of stability or not, and can only then act on the operating means of the vehicle. Moreover, the currently available ESP system observes only the movements of the body of the vehicle without knowing specifically the exact reasons for the loss of control. The movements of the body of the vehicle are caused by contact between the tire and the ground.

The system will detect a displacement of the vehicle not in accord with the command given by the driver, more slowly the greater the inertia of the vehicle, and the necessary correction will be all the more difficult the greater the inertia. At the present time the operating means are basically the vehicle's brakes, controlled in this case wheel by wheel and outside the voluntary action of the driver, and the motive force, which can be reduced automatically by regulating the engine.

Furthermore, the detection of yaw movements requires the use of costly sensors. Also, existing systems have to estimate the grip of the wheels on the road surface in order to select the actuating parameters. This estimation deviates to a greater or lesser degree from the actual conditions.

The object of the present invention is to obviate the aforementioned disadvantages and, more particularly, to exclude completely the inertia of a vehicle in order to be able to act on the appropriate operating means so as to maintain the vehicle in a stable path in accordance with the driver's commands, by regulating the operating means in such a way that the actual forces acting at the center of each wheel correspond to the desired forces.

The invention provides a vehicle stability control system and a method for controlling the stability of a vehicle that have the advantage that they can be carried out without having to measure the yaw angle of the vehicle.

The invention relates to a vehicle comprising a body and at least one front ground contacting arrangement and at least one rear ground contacting arrangement, each ground contacting arrangement comprising in each case one wheel, each wheel comprising a pneumatic or non-pneumatic tire in contact with the ground, the vehicle having a characteristic time that is a function of its inertia and corresponds to the time phase shift in the manifestation of the cornering forces on the wheels in the front and in the rear, following a command from the driver of the vehicle, the vehicle being provided with operating means to act on the forces transmitted to the ground by each of the wheels.

In a vehicle the steering of the wheels produces a cornering force at the front, a movement of the vehicle body, followed by a cornering force at the rear. The cornering force of the rear wheel or wheels thus intervenes with a slight delay with respect to the command on the steering wheel. In order to establish more precisely the actions required to correct the path, the invention proposes to take into account this delay T as explained hereinafter.

According to a first aspect of the invention, the method comprises the following steps:
(a) measuring in real time the actual value of one variable selected in the group of the cornering force "Y" and the vertical load "Z" acting at the center of each of the front and rear wheels;
(b) calculating in real time the desired value of at least one reference parameter, said at least one reference parameter being correlatable to the actual value, as a result of an action of the driver on the operating means and taking into account the load transfers on both sides of the mid plane of symmetry of the vehicle;
(c) comparing said desired value of the reference parameter of step (b) to the actual value to determine whether the actual value is compatible with the desired value of the reference parameter; and
(d) if the comparison of step (c) indicates that the actual value is not compatible, acting on the operating means such that the actual value is brought into substantial compatibility with the desired value of the reference parameter.

A preferred aspect relating to the specific application of the invention to vehicles each of whose axles comprises at least two ground contacting arrangements each comprising one wheel, is described hereinafter, the ground contacting arrangement being mounted on either side of the mid-plane of symmetry of the vehicle. This is the conventional arrangement in a four-wheeled touring vehicle. However, the invention is also applicable to two-wheeled vehicles, such as motorbikes, being noted that in this case the inertia of the body is considerably lower. Each ground contacting arrangement comprises a wheel, generally having a tire, which in this description means a pneumatic tire or non-pneumatic tire, in contact with the ground. The vehicle is provided with operating means to act on the forces transmitted to the ground by each of the wheels, such as brakes, means for steering the wheels, optionally selectively wheel by wheel, and distribution of the loads carried by each of the wheels.

The commands of the driver of the vehicle are intended to maintain the vehicle on a straight line path regardless of the ambient disturbances (for example sidewind gusts, change of the road grip on all or part of the vehicle), or are intended to cause the vehicle to execute a transverse displacement (change of lane for overtaking on a motorway) or to turn. Regardless of the operating means of the vehicle that are actuated by the driver (conventional steering wheel, operating lever as illustrated for example in patent application EP 0 832 807), the driver's wish in fact is to exert specific cornering forces or specific changes of these cornering forces.

The invention thus proposes to measure in real time the effective cornering forces, compare them to commands of the driver translated into cornering forces or changes in cornering forces, and thereby to control appropriate operating means available on the vehicle. In a first particular embodiment, said variable is the cornering force "Y" and said desired value of at least one reference parameter of step (b) is the desired cornering force "$Y_d$" at the center of each wheel. More particularly, step (c) further comprises generating an error signal representative of the magnitude and direction of the difference between the actual and desired cornering forces and step (d) comprises controlling said operating means to minimize said error signal.

In another particular embodiment, said variable is the cornering force "Y", said operating means including a command for controlling the steering, step (a) comprises calculating in real time the effective yaw moment corresponding to the actual cornering forces "Y", said desired value of at least one reference parameter of step (b) being the desired yaw moment, step (a) comprises measuring in real time a signal at the steering command and calculating the desired yaw moment "$M_d$", and step (c) comprises utilizing said desired yaw moment "$M_d$" for comparison with the effective yaw moment of step (a). More particularly, step (c) further comprises generating an error signal representative of the magnitude and the direction of the difference between the effective yaw moment and the desired yaw moment "$M_d$"; and step (d) comprises controlling said operating means to minimize said error signal.

Accordingly, if the cornering force of the front axle has been saturated, the vehicle will understeer since the cornering forces of the front train are less than the forces desired by the driver (desired forces meaning forces corresponding to the actions by the driver on his steering wheel or on other steering commands available). An automatic action, for example of the type already known per se in conventional ESP systems (other types of actions will be discussed hereinafter) enables a resultant force to be exerted on the vehicle chassis in accordance with the driver's wishes and thus enables understeering to be avoided.

If on the other hand it is the cornering force of the rear axle that first becomes saturated, then the vehicle will oversteer since the cornering forces of the rear train are less than the forces desired by the driver. The automatic action enables a resultant force to be exerted on the vehicle chassis in accordance with the driver's wishes and thus enables oversteering to be avoided.

The above description refers to what is conventionally called the stationary state (or steady state). When considering a typical transient state involved in an emergency maneuver (avoiding an obstacle, changing lane), the speed of engagement of the steering wheel may be regarded as equivalent to a desired yaw moment acting on the vehicle. If the actual yaw moment is less than the desired yaw moment, the vehicle will not turn sufficiently. If on the other hand the actual yaw moment is greater than the desired yaw moment, the vehicle will turn too much.

According to yet another particular embodiment, said variable is the vertical load "Z". More particularly, said operating means including a command for controlling the steering, and said desired value of at least one reference parameter of step (b) being the desired load "$Z_d$" at the center of each of the front and rear wheels, the method comprises a step for measuring in real time a signal at the steering command and calculating the desired loads "$Z_d$". More particularly, step (c) further comprises generating an error signal representative of the magnitude and the direction of the difference between the actual loads "Z" and the desired loads "$Z_d$"; and step (d) comprises controlling said operating means to minimize said error signal.

The method according to the invention permits, if the cornering forces of one of the axles do not correspond to the desired cornering forces, or if the effective yaw moment is greater than the desired yaw moment, or if the vertical loads do not correspond to the desired vertical loads, the transmission of an action signal to the operating means in order to minimize the error signal without the need to establish such a signal, without the need to measure the yaw rate of the vehicle. Of course, such a method is compatible with measuring the yaw rate, particularly if it is desired to add redundancy terms to the calculations.

As can be seen, the invention provides a method for regulating a system for controlling the stability of a vehicle based on the forces acting at the center of each wheel of the vehicle. More specifically, the actions of the driver, whether they involve steering, accelerating or braking, will be reflected in forces (changes in forces) transmitted by the tires to the ground. Depending on whether or not these force variations are compatible with respect to the commands of the driver, it may be concluded whether or not the vehicle is stable. The origin of future displacements is found starting from the forces acting on the ground. In this way it is possible to correct the path of the vehicle much sooner and an ESP system, or more generally a stability control system, gains in fineness of correction. Both the safety and comfort of the driver and passengers are improved.

The estimation of stability criteria in real time, based on forces acting on the ground, enables the stability control of the path of a vehicle to be improved, the direct measurement of the force enabling, for example, the saturation point of the tire on each of the wheels to be monitored accurately regardless of the grip on the road surface, by detecting the occurrence of non-linearity between the developed cornering force and the sideslip angle of the tire in question, as well as non-linearity of the developed cornering force and the load applied to the tire.

The cause of loss of stability of the vehicle is mainly the fact that the tires are no longer able to correct the path, given the movement of the vehicle. Irrespective of the cornering force developed by the tires, this will never be able to counteract the forces of inertia. This may be due to a poor grip (wet road, (black) ice, snow, sand, dead leaves), to the fact that the tire is used by the driver under improper conditions (flat tire or underinflated tire), or to the fact that the vehicle is directly placed in a situation of excessive drift or sideslip that exceeds the physical limits of one or more of the tires. In this case it may be said that one or more of the tires reaches its saturation point.

The suspension bearings may be equipped with instruments, as proposed in patent application JP60/205037, which enables the longitudinal and transverse forces developed by the tire to be recognized easily by measurements made on the suspension bearings. Alternatively, the tire itself is equipped with sensors for recording the forces of the tire on the ground. A measurement may for example be made as explained in patent DE 39 37 966 or as discussed in U.S. Pat. No. 5,864,056 or in U.S. Pat. No. 5,502,433.

On the basis of the forces measured by one or other of the above methods, and from equilibrium equations of a ground contacting arrangement, the forces acting at the center of each wheel may accordingly easily be calculated. Thus, in real time 3 forces X, Y and Z are available, which in particular enables the Y or Z signal to be processed for the reasons explained in the present document.

The invention also relates to vehicle stability control systems, said vehicle having a body and at least one front ground contacting arrangement and at least one rear ground contacting arrangement, each ground contacting arrangement comprising in each case one wheel, each wheel comprising a pneumatic or non-pneumatic tire in contact with the ground, the vehicle having a characteristic time that is a function of its inertia and corresponds to the time phase shift in the manifestation of the cornering forces on the wheels in the front and in the rear, following a command from the driver of the vehicle, the vehicle being provided with operating means to act on the forces transmitted to the ground by each of the wheels, such as brakes, means for steering the wheels. The system further comprises:
  (a) means for measuring in real time the actual values of one variable selected in the group of the cornering force "Y" and the vertical load "Z" acting at the center of each of the front and rear wheels;
  (b) a controller allowing to calculate in real time the desired values of at least one reference parameter, said at least one reference parameter being correlatable to the actual values, as a result of an action of the driver on the operating means and taking into account the load transfers on both sides of the mid plane of symmetry of the vehicle, said controller allowing to perform comparisons between the desired values with the measured actual values in order to obtain an error signal, and;
  (c) means for acting on the operating means so as to minimize the error signal.

According to various aspects, as explained hereabove for the method for controlling the stability of a vehicle, the variable can be the actual cornering force "Y" in which case the reference parameter can be either the desired cornering force "$Y_d$" or the desired yaw moment "$M_d$", or said variable is the vertical load "Z" and the reference parameter is the desired loads "$Z_d$".

BRIEF DESCRIPTION OF THE DRAWINGS

The invention will be described in more detail hereinafter with the aid of the accompanying figures, in which:

FIG. 1 is a block diagram illustrating a system in accordance with the invention.

FIG. 3b is a side view of a four-wheeled vehicle of FIG. 3a;

FIG. 3c is a front view of a four-wheeled vehicle of FIG. 3a;

FIGS. 5a–c, 6a–d, and 7a–d illustrate the forces resulting from a steering command in the form of an increasing sinusoidal curve, on a wet surface at 90 km/hour, in which, FIG. 5a illustrates the front axle cornering force, FIG. 5b illustrates the rear axle cornering force, FIG. 5c illustrates the yaw moment, FIG. 6a illustrates the left front load, FIG. 6b illustrates the right front load, FIG. 6c illustrates the left rear load, FIG. 6d illustrates the right rear load, FIG. 7a illustrates the left front cornering force, FIG. 7b illustrates the right front cornering force, FIG. 7c illustrates the left rear cornering force, and FIG. 7d illustrates the right rear cornering force;

FIGS. 8a–c, 9a–d, and 10a–d illustrate the forces resulting from a steering command in the form of a increasing sinusoidal curve, on a wet surface at 90 km/hour for a vehicle equipped with means for controlling the anti-rolling distribution, in which, FIG. 8a illustrates the front axle cornering force, FIG. 8b illustrates the rear axle cornering force, FIG. 8c illustrates the yaw moment, FIG. 9a illustrates the left front load, FIG. 9b illustrates the right front load, FIG. 9c illustrates the left rear load, FIG. 9d illustrates the right rear load, FIG. 10a illustrates the left front cornering force, FIG. 10b illustrates the right front cornering force, FIG. 10c illustrates the left rear cornering force, and FIG. 10d illustrates the right rear cornering force;

FIGS. 13a–c, 14a–d, and 15a–d illustrate the forces resulting from an avoidance maneuver, on a wet surface, at 90 km/hour, leading to a destabilization of the vehicle, in which, FIG. 13a illustrates the front axle cornering force, FIG. 13b illustrates the rear axle cornering force, FIG. 13c illustrates the yaw moment, FIG. 14a illustrates the left front load, FIG. 14b illustrates the right front load, FIG. 14c illustrates the left rear load, FIG. 14d illustrates the right rear load, FIG. 15a illustrates the left front cornering force, FIG. 15b illustrates the right front cornering force, FIG. 15c illustrates the left rear cornering force, and FIG. 15d illustrates the right rear cornering force;

FIGS. 16a–c, 17a–d, and 18a–d illustrate the forces resulting from an avoidance maneuver, on a wet surface, at 90 km/hour, for a vehicle equipped with a control of the anti-rolling distribution, in which FIG. 16a illustrates the front axle cornering force, FIG. 16b illustrates the rear axle cornering force, FIG. 16c illustrates the yaw moment, FIG. 17a illustrates the left front load, FIG. 17b illustrates the right front load, FIG. 17c illustrates the left rear load, FIG. 17d illustrates the right rear load, FIG. 18a illustrates the left front cornering force, FIG. 18b illustrates the right front cornering force, FIG. 18c illustrates the left rear cornering force, and FIG. 18d illustrates the right rear cornering force;

DETAILED DESCRIPTION

We shall start from the fact that, at a given velocity, an angle at the steering wheel imposed by the driver may be interpreted as a cornering force or load instruction, or as a yaw moment instruction on the vehicle. This is shown diagrammatically in the upper part of FIG. 1. Furthermore, it has been seen that in order to implement the present invention, it is necessary to have measurements of the actual cornering forces (cornering forces of the tires or elastic tire casings used in the ground contacting arrangement). This is illustrated in the left-hand section, starting from "vehicle," in FIG. 1. In the case where it is desired to act on the distribution of the loads (see other explanations below concerning the effect on the yaw moment of the distribution of the loads), it is necessary to have measurements of the actual loads.

Figure 1A:
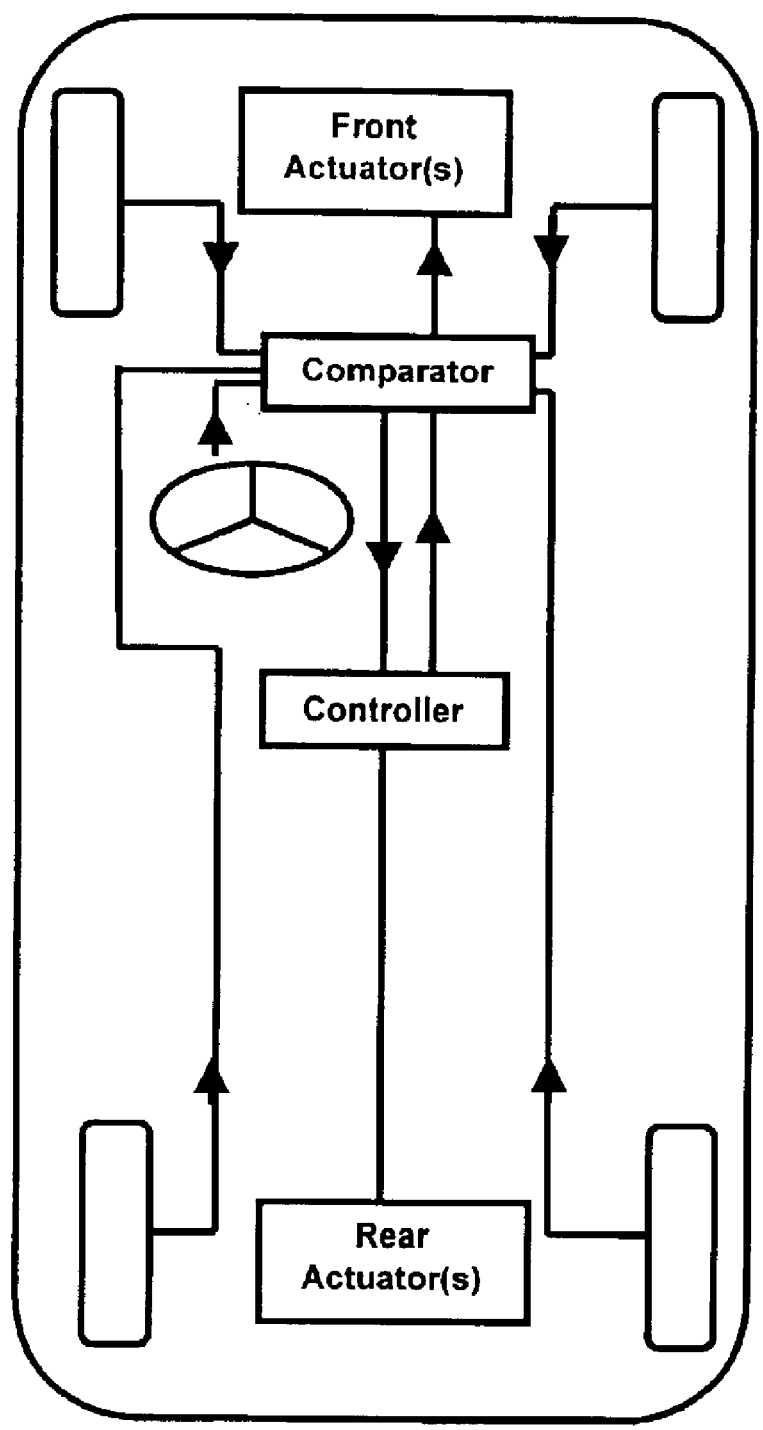
FIG. 1A shows schematically a car featuring the system according to the invention.

The diagram in FIG. 1 superimposes several methods: either the actions of the driver at a given moment and the preceding actions are interpreted as a demand for cornering forces, which are compared to the cornering forces measured at the center of the wheel, or the actions of the driver and the preceding actions are interpreted as a demand for changes in load, which are compared to the loads measured at the center of the wheel, or alternatively, the actions of the driver are interpreted as a demand for a yaw moment, and the cornering force measurements made at the center of the wheel are converted into a measured yaw moment in order to make the required comparison. The differences found by a comparator enable a controller to decide on the necessary correction by acting on the operating means so as to stabilize the vehicle and make it follow the instructions of the driver.

In a vehicle, the steering of the wheels results in a cornering force of the front axle, a movement of the vehicle body, followed by a cornering force of the rear axle. The cornering force of the rear axle thus occurs with a slight delay with respect to the command on the steering wheel. In order to be able to determine the path correction actions more accurately, the invention proposes to take account of this delay.

The instruction values of the cornering forces then depend on the action on the steering command at the present instant t and at the instant t minus the delay associated with the inertia of the vehicle (termed T). This delay time depends only on the characteristics of the vehicle (inertia, wheelbase) and the sideslip rigidities of its pneumatic suspension. An expression for this delay time is:

$$T = \frac{I_{Vehicle} V}{l_1^2 D_F + l_2^2 D_R}$$

where

V is the instantaneous velocity of the vehicle;

$I_{vehicle}$ is the inertia of the vehicle undergoing yaw (also referred to as Iz);

L1 is the distance from the front axle to the center of gravity;

L2 is the distance from the rear axle to the center of gravity; and, $D_F$, $D_R$ are the sideslip rigidities of the front and rear axles (sum of the sideslip derivatives of the tires of the same axle).

It is assumed that the cornering forces of the front train are less than the forces required by the driver (as determined by his actions on the commands). An automatic action enables a resultant force on the vehicle chassis to be obtained in accordance with the wishes of the driver and thus enables understeering to be avoided.

The various operating means that may be actuated include, of course, the brakes. As an alternative or in addition to a braking action, an action on a supplementary steering means, exerted for example by means of an irreversible stepping motor mounted in the steering column, also enables the resultant forces on the vehicle chassis to be approximated in accordance with the wishes of the driver. Another possible way of effecting the action on a steering means consists for example in sending the appropriate control commands to the controller described in U.S. Pat. No. 5,884,724.

As an alternative or as a further addition to braking actions or actions on the steering mentioned above, an action on the distribution of the anti-roll device between the front axle and rear axle also enables action to be exerted on the cornering forces developed respectively by the front and rear axles. This involves altering the load supported by each wheel by modifying the distribution of the overall load (unchanged) between the wheels, fully taking account of the load transfer to the outer wheels when steering or cornering.

In fact, when a vehicle departs from the path desired by the driver, one or other or several of the tires become incapable of developing the excess cornering force that they would have had to develop in order to compensate for the forces of inertia. It may be said that the tire or tires have reached their saturation limit. More specifically, this saturation phenomenon, when it starts, involves for most of the time a single tire of a single axle. As a result one of the axles becomes incapable of developing the expected cornering force and the vehicle will oversteer or understeer depending on whether the saturation involves the rear axle or the front axle.

Furthermore, it is known that when steering, the centrifugal force overloads the outer tires. The distribution of this overload between the front axle and rear axle depends on the anti-roll characteristics of the vehicle suspension.

By reducing the share of anti-rolling force developed by the axle containing the tire whose cornering force reaches saturation point first, not only can the other tire on the same axle develop a greater cornering force due to a larger vertical load, but also the saturation point of a tire on the other axle will be approached or even reached, thereby setting a limit on or reducing the cornering forces developed by the other axle.

If on the other hand it is the cornering force of the rear axle that reaches saturation point first, the vehicle oversteers because the cornering force forces of the rear train are less than the forces desired by the driver. An automatic braking action or action on a supplementary steering means or on the anti-roll distribution enables a resultant forces to be obtained on the vehicle chassis in accordance with the wishes of the driver and thus enables oversteering to be avoided.

Figure 2:
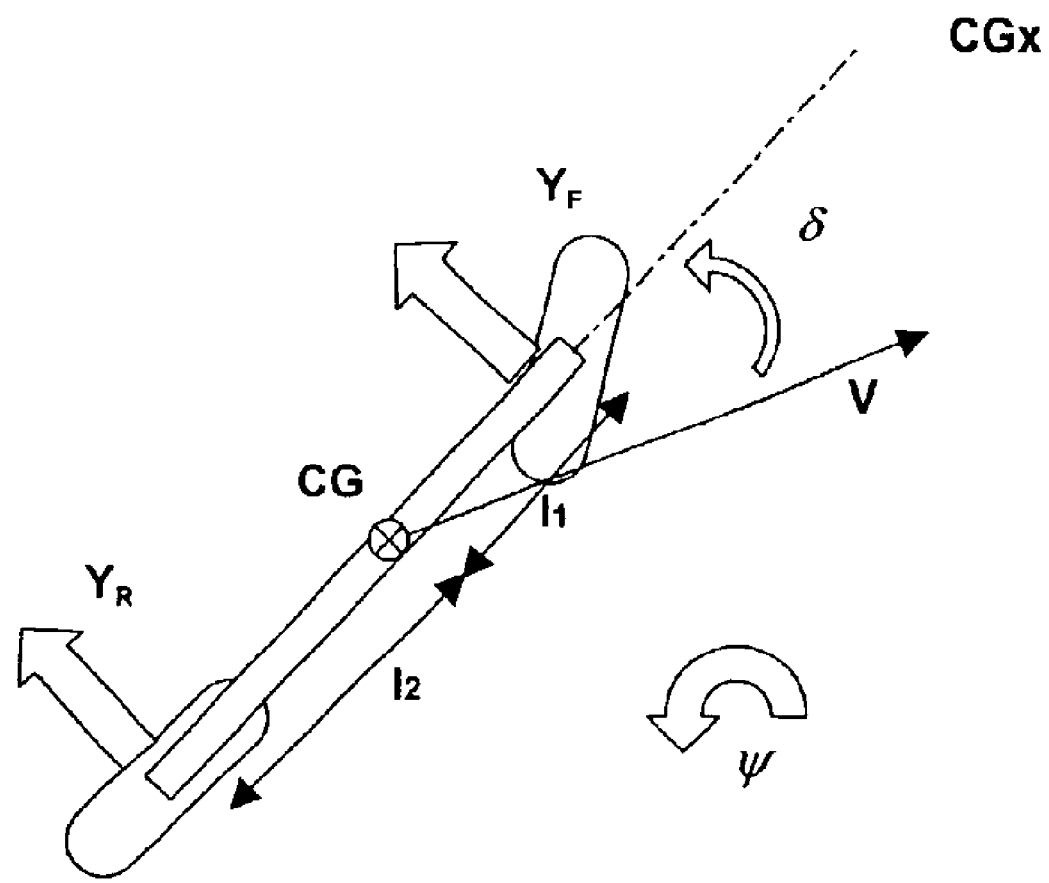
FIG. 2 shows the arrangement of a two-wheeled vehicle and frame of reference.

FIG. 2 shows a representation of a two-wheeled vehicle according to a commonly adopted simplification employed also for modeling four-wheeled vehicles. The center of gravity of the vehicle is denoted by CG, the longitudinal axis of the vehicle connecting the front wheel (turned) and the rear wheel and passing through the center of gravity (axis CGx). The sum of the cornering forces $Y_F$, $Y_R$ acting on the wheels of each axle in question is translated to the center of each axle. The angle $\delta$ that the velocity vector makes with respect to the longitudinal axis of the vehicle, and the yaw rate $\dot\psi$ of the vehicle around the vertical axis of the vehicle are shown. The distance between the front axle (and respectively the rear axle) and the center of gravity CG is denoted by $l_1$ (respectively $l_2$). Such a diagram already enables interesting results to be obtained.

However the invention proposes, in order to determine more accurately the correction actions on the path, to take account of the forces on the ground wheel by wheel. In the center of an axle a comparison of the cornering forces of each wheel and the desired cornering forces enables the cause of saturation of the overall arrangement of the axle to be determined exactly and thus enables more effective correction actions to be selected.

Figure 3A:
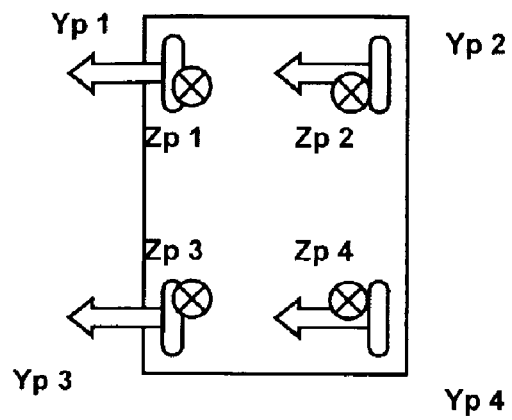
FIG. 3a shows the arrangement of a four-wheeled vehicle and frame of reference.

FIG. 3a shows diagrammatically a four-wheeled vehicle, with a center of gravity CG. Neither the angle $\delta$ that the velocity vector makes with respect to the longitudinal axis of the vehicle, nor the yaw angle $\psi$ are shown, so as not to complicate the diagram. The four-wheeled model is closer to the vehicle in the sense that it takes into account the forces on the centers of the four wheels and expresses the lateral load transfers associated with the engagement of the anti-roll device of the vehicle when steering. The four-wheeled model is accordingly more complete than the two-wheeled model and more accurately reflects the action of the load transfers on the dynamics of the vehicle. The loads on each of the four tires are represented by Zp1, Zp2, Zp3 and Zp4. The cornering forces (or lateral forces) acting on each of the wheels are identified by the reference numerals Yp1, Yp2, Yp3 and Yp4.

Figure 3B:
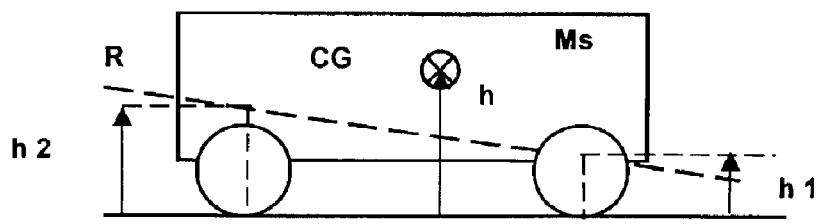

FIG. 3b shows the rolling axis R of the vehicle, the height h of the center of gravity CG with respect to the ground, the height $h_1$ of the rolling axis R with respect to the ground in the vertical plane passing through the center of the areas of contact of the tires of the front axle with the ground, and the height $h_2$ of the rolling axis with respect to the ground in the vertical plane passing through the center of the areas of contact of the tires of the rear axle with the ground. The four-wheeled model is based on the assumption of a sprung mass MS resting on 2 axles. This sprung mass is able to rotate about the rolling axis R.

Figure 3C:
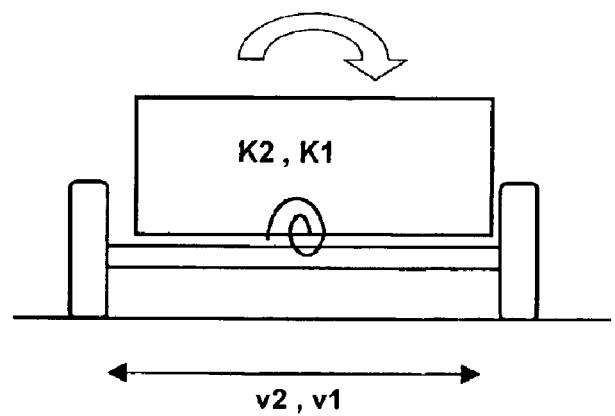

FIG. 3c shows the oversteering moment of the vehicle caused by the load transfer in the transverse direction, $K_1$ and $K_2$ representing the anti-rolling rigidities on respectively the front axle and the rear axle. In the diagram "v1" denotes the front track of the vehicle and "v2" denotes the rear track of the vehicle.

The monitoring of the four supports and error signals generated between the desired cornering forces and actual cornering forces enables the four supports to be optimized by acting in an appropriate manner on the operating means, as will be explained hereinafter.

The procedure for controlling the operating means described above are shown diagrammatically in the "Controller" box in FIG. 1, which controls the one or more "operating means" discussed above.

The above paragraphs refer to what is commonly known as the stationary state (or the steady state). Considering a typical transient state of an emergency maneuver (avoiding an obstacle, changing lane), the speed of actuation of the steering wheel is instead regarded as equivalent to a desired yaw moment on the vehicle. If the actual yaw moment is less than the desired yaw moment, the vehicle does not turn sufficiently. If the actual yaw moment is greater than the desired yaw moment, the vehicle turns excessively. The controller then acts in an appropriate manner on one or other or several of the possible operating means including the brakes, or on a supplementary steering means or on the distribution of the anti-rolling system, thereby enabling a yaw moment to be exerted on the vehicle chassis in accordance with the wishes of the driver.

The following conventional expressions will be adopted:

Desired front axle cornering force: $Y_F d$

Desired rear axle cornering force: $Y_R d$

Desired cornering force of the tires: $Yp_{1,2,3,4} d$

Desired load on each tire: $Zp_{1,2,3,4} d$

Desired yaw moment: $M_{z\,d}$ $\psi$ yaw angle of the vehicle $\delta$ sideslip angle of the vehicle $\alpha_c$ steering angle of a wheel $\gamma t$ transverse acceleration $D_{1,2,3,4}$ the sideslip rigidities of the tires $D_F$ and $D_R$ the sideslip rigidities of the front and rear axles A two-wheeled vehicle will first of all be discussed hereinafter (see FIG. 2).

The equations of the two-wheeled vehicle are as following:

$$M\gamma_t = MV(\dot\delta + \dot\psi) = Y_F + Y_R \quad (1)$$

where M is the mass of the vehicle, V is the longitudinal velocity of the vehicle, $Y_F$ is the cornering force on the front axle, and $Y_R$ is the cornering force on the rear axle, equation (1) expressing the fact that the cornering forces balance out the transverse acceleration, $$I_z \ddot\psi = l_1 Y_F - l_2 Y_R \quad (2)$$

where $I_z$ is the yaw inertia, $l_1$ is the distance from the front axle to the center of gravity, $l_2$ is the distance from the rear axle to the center of gravity, equation (2) expressing the fact that the moments are in equilibrium.

The rigid body movement of the two-wheeled vehicle and the steering of the wheels of the front axle enables the sideslips of the front and rear tires to be expressed as follows:

$$\text{Sideslip of the front train:: } \delta_F = \delta + l_1 \frac{\dot\psi}{V} - \alpha_C \quad (3)$$

$$\text{Sideslip of the rear train: } \delta_{Arr} = \delta - l_2 \frac{\dot\psi}{V} \quad (4)$$

The quantity l1 (respectively l2) is the distance from the front axle (respectively rear axle) to the center of gravity CG of the vehicle. The geometry of the vehicle is shown in FIG. 2.

These sideslips of the tires give rise to cornering forces on the two-wheeled vehicle:

$$Y_F = -D_F \delta_F \qquad (5)$$

$$Y_R = -D_R \delta_R \qquad (6)$$

By substituting the equations 3 and 4 in 5 and 6, one obtains $$Y_F = -D_F \left( \delta + l_1 \frac{\dot{\psi}}{V} - \alpha_C \right) \qquad (7)$$

$$Y_R = -D_R \left( \delta - l_2 \frac{\dot{\psi}}{V} \right) \qquad (8)$$

By substituting the equations (7) and (8) in the equations (1) and (2), a system is obtained that is expressed only as a function of the yaw rate (and its derivative), the sideslip angle (and its derivative), and the characteristics of the vehicle:

$$MV(\dot{\delta} + \dot{\psi}) = D_F \left( \delta + \frac{l_1 \dot{\psi}}{V} - \alpha_c \right) + D_R \left( \delta - \frac{l_2 \dot{\psi}}{V} \right) \qquad (1 \text{ bis})$$

$$I_z \ddot{\psi} = l_1 \left( D_F \left( \delta + \frac{l_1 \dot{\psi}}{V} - \alpha_c \right) \right) - l_2 \left( D_R \left( \delta - \frac{l_2 \dot{\psi}}{V} \right) \right) \qquad (2 \text{ bis})$$

By a Laplace transform it is possible to express the transfer functions between the yaw rate and the angle at the steering wheel, and between the body sideslip and the angle at the steering wheel. The static part (that is to say the part relating to a zero frequency) of this transfer function is then simply expressed as a function of the characteristics of the vehicle (coefficient of proportionality) and of the forward movement velocity:

$$\dot{\psi} = \frac{1}{l_1 + l_2} \frac{V}{1 + \frac{V^2}{\frac{D_F D_R (l_1 + l_2)^2}{M(D_R l_2 - D_F l_1)}}} \alpha_c \qquad (9)$$

$$\delta = \frac{1}{l_1 + l_2} \frac{l_2 - \frac{l_1 M V^2}{D_R (l_1 + l_2)}}{1 + \frac{V^2}{\frac{D_F D_R (l_1 + l_2)^2}{M(D_R l_2 - D_F l_1)}}} \alpha_c \qquad (10)$$

These expressions may be simplified by introducing a quantity Vc, called critical velocity, which is comparable to a velocity and depends on the characteristics of the vehicle (weight supported by the front axle $M_F$, weight supported by the rear axle $M_R$, distances l1 and l2) and its pneumatic mounting:

$$V_c^2 = \frac{D_F D_R (l_1 + l_2)^2}{M(D_R l_2 - D_F l_1)} = \frac{D_F D_R (l_1 + l_2)}{D_R M_F - D_F M_R} = \frac{l_1 + l_2}{\frac{M_F}{D_F} - \frac{M_R}{D_R}} \qquad (11)$$

The expressions (9) and (10) become:

$$\dot{\psi} = \frac{1}{l_1 + l_2} \frac{V}{1 + \frac{V^2}{V_c^2}} \alpha_c$$

$$\delta = \frac{1}{l_1 + l_2} \frac{l_2 - \frac{l_1 M V^2}{D_R (l_1 + l_2)}}{1 + \frac{V^2}{V_c^2}} \alpha_c$$

These expressions may be reintroduced into the equations (3) and (4) and then into the equations (5) and (6) in order to obtain the forces desired by the driver:

$$Y_F \text{desired} = \frac{M_F}{l_1 + l_2} \frac{V^2}{1 + \frac{V^2}{V_c^2}} \alpha_c \qquad (12)$$

$$Y_R \text{desired} = \frac{M_R}{l_1 + l_2} \frac{V^2}{1 + \frac{V^2}{V_c^2}} \alpha_c \qquad (13)$$

It can be seen that these formulae express the fact that the cornering force demand resulting from the actions of the driver depends only on the command ($\alpha_c$) itself, on the velocity of the vehicle (V) and on other parameters, all of which are functions of the vehicle itself (that is to say describe the vehicle).

Finally, by differentiating equation (9) and multiplying the yaw acceleration by the yaw inertia, one obtains the desired yaw moment Mz:

$$\ddot{\psi} = \frac{1}{l_1 + l_2} \frac{V}{1 + \frac{V^2}{V_c^2}} \dot{\alpha}_c$$

$$M_Z \text{desired} = I_Z \ddot{\psi} = \frac{I_z}{l_1 + l_2} \frac{V}{1 + \frac{V^2}{V_c^2}} \dot{\alpha}_c \qquad (14)$$

Similarly, formula (14) expresses the fact that the yaw moment demand resulting from the actions of the driver depends only on the command ($\alpha_c$) itself, on the velocity of the vehicle (V) and on other parameters, all of which are functions of the vehicle itself (that is to say describe the vehicle).

It is also possible to express the changes of commands at the steering wheel as demands for changes of forces in the trains:

$$\dot{Y}_F \text{desired} = \frac{M_F}{l_1 + l_2} \frac{V^2}{1 + \frac{V^2}{V_c^2}} \dot{\alpha}_c \qquad (15)$$

$$\dot{Y}_R \text{desired} = \frac{M_R}{l_1 + l_2} \frac{V^2}{1 + \frac{V^2}{V_c^2}} \dot{\alpha}_c \qquad (16)$$

$$Y_R \text{desired}(t) = \frac{M_R}{1 + \frac{V^2}{V_c^2}} \frac{V^2}{l_1 + l_2} \alpha_c(t - T) \quad (17)$$

$$\dot{Y}_R \text{desired}(t) = \frac{M_R}{l_1 + l_2} \frac{V^2}{1 + \frac{V^2}{V_c^2}} \dot{\alpha}_c(t - T)$$

The instruction at the instant t depends on the steering command at the instant t−T. This delay, which is associated with the yaw inertia of the vehicle, appears as a characteristic time of the vehicle in equation (2 bis). /

$$I_z \ddot{\psi} = l_1 \left( D_F \left( \delta + \frac{l_1 \dot{\psi}}{V} - \alpha_c \right) \right) - l_2 \left( D_R \left( \delta - \frac{l_2 \dot{\psi}}{V} \right) \right)$$

$$I_z \ddot{\psi} - \frac{l_1^2 D_F + l_2^2 D_R}{V} \dot{\psi} = (l_1 D_F - l_2 D_R)\delta - l_1 D_R \alpha_c$$

The yaw time constant is thus:

$$T = \frac{I_z V}{l_1^2 D_F + l_2^2 D_R} \quad (18)$$

It is assumed that it is possible to measure at each instant the cornering forces Y for all the wheels, the variations of the cornering forces Y, and the variations of angle at the steering wheel. It is proposed to actuate a path control system as soon as the difference between the desired forces and the actual measured forces becomes too large. The criterion of stability that is thus proposed expresses the fact that the vehicle remains stable as long as this difference is small (compromise between the wishes of the driver and the actual conditions).

Figure 4:
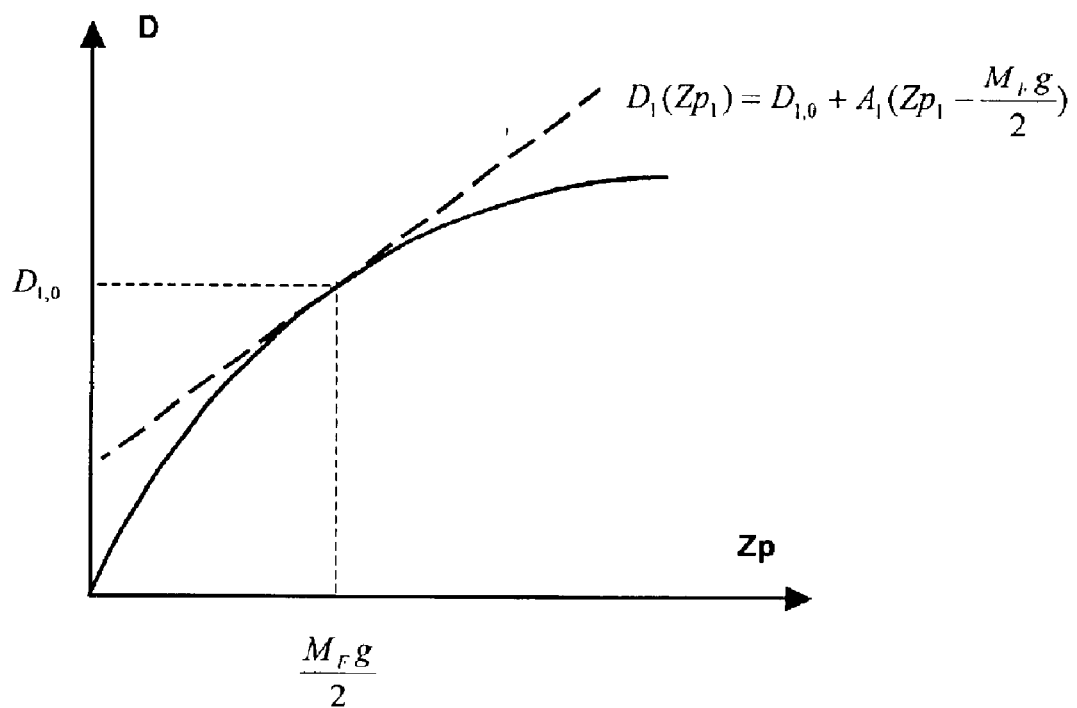
FIG. 4 shows the linearized cornering stiffness curve.

This criterion of stability takes into account the fact that the cornering force of the tire reaches saturation point either because the tire is no longer in a straight line with the sideslip, or because the tire is no longer in a straight line with the applied load. In order to be able to detect this double saturation more readily, it is assumed that the tire is in a straight line with respect to both the load and the sideslip. This linearization is illustrated in FIG. 4. The continuous line represents a real curve giving the value of the cornering stiffness of a tire as a function of the load applied to the tire, and the dotted line, plotted according to the linearization assumption, gives the value of the cornering stiffness of a tire as a function of the load applied to the tire. It can be seen that the difference with respect to reality increases as the saturation point (load saturation) of the tire is approached. Furthermore, the linear model representing the cornering stiffness of the tire with respect to the load should give results comparable to the actual state of affairs close to the operational point so as not to trigger a system under normal driving conditions (see meeting point of the continuous curve and dotted line curve). The proposed solution consists in modeling a theoretical tire that would have a linear cornering stiffness (dotted straight line curve), forming a tangent to a real cornering stiffness curve at the static operating point $M_F g/2$, that is to say without transfer of load.

By linearizing the expression for the cornering stiffness of a tire on the front axle, we obtain:

$$D_1(Z_{p_1}) = D_{1,0} + \left(\frac{\partial D_1}{\partial Z}\right)_0 \left(Z_{p_1} - \frac{M_F g}{2}\right) \quad (19)$$

$$\frac{\partial D}{\partial Z}$$

is the sensitivity of the cornering stiffness to the transfer of load in the vicinity of the static load $M_F g/2$. This sensitivity at the front is denoted A1 and at the rear is denoted A2. $D_{1,0}$ is the cornering stiffness of the front tire under a static load $M_F g/2$ The cornering stiffness of a front tire thus takes the form:

$$D_1(Z_{p_1}) = D_{1,0} + A_1 * \left(Z_{p_1} - \frac{M_F g}{2}\right) \quad (19 \text{ bis})$$

The cornering stiffness of a rear tire thus takes the form:

$$D_3(Z_{p_3}) = D_{3,0} + A_2 * \left(Z_{p_3} - \frac{M_R g}{2}\right)$$

Similarly, the suspension is modeled by linear relationships giving load transfers under a permanent regime. The following notations are adopted to describe the suspensions:

Ms sprung weight of the vehicle;
K1 rigidity of the front anti-rolling bar;
K2 rigidity of the rear anti-rolling bar;
h1 height of the front axle rolling center;
h2 height of the rear axle rolling center;
h height of the center of gravity;
V1 track of the front train; and,
V2 track of the rear train.

These notations are illustrated in FIGS. 3a, 3b, 3c.

By means of the expressions for the desired cornering forces, and using the linear suspension model, the discounted load transfer on axle 1 is:

$$\Delta Z_F \text{ desired} = \frac{1}{v_1}\left[\frac{K_1 h}{K_1 + K_2 - M_S g h} + \frac{M_F}{M_S} h_1\right] \frac{M_S}{1 + \frac{V^2}{V_c^2}} \frac{V^2}{l_1 + l_2} \alpha_c \quad (20)$$

Furthermore, the vehicle body movements are delayed with respect to the steering wheel steering, with a delay time given by expression (18).

$$\Delta Z_F \text{ desired}(t) = \quad (20 \text{ bis})$$

$$\frac{1}{v_1}\left[\frac{K_1 h}{K_1 + K_2 - M_S g h} + \frac{M_F}{M_S} h_1\right] \frac{M_S}{1 + \frac{V^2}{V_c^2}} \frac{V^2}{l_1 + l_2} \alpha_c(t - T)$$

On the tires of the front train the instruction load is thus the sum of the static load on a quarter of the vehicle and the load transfer on the axle.

$$Z_{p_1} \text{ desired} = \frac{M_F g}{2} + \Delta Z_{Av} \text{ desired}$$

-continued $$Zp_2 \text{ desired} = \frac{M_F g}{2} - \Delta Z_F \text{ desired}$$

On the front train the expected vertical loads are:

$$Zp_1 \text{desired}(t) = \frac{M_F g}{2} + \frac{1}{v_1}\left[\frac{K_1 h}{K_1 + K_2 - M_S gh} + \frac{M_F}{M_S}h_1\right]\frac{M_S}{1 + \frac{V^2}{V_c^2}}\frac{V^2}{l_1 + l_2}\alpha_c(t-T) \quad (21)$$

$$Zp_2 \text{ desired}(t) = \frac{M_F g}{2} - \frac{1}{v_1}\left[\frac{K_1 h}{K_1 + K_2 - M_S gh} + \frac{M_F}{M_S}h_1\right]\frac{M_S}{1 + \frac{V^2}{V_c^2}}\frac{V^2}{l_1 + l_2}\alpha_c(t-T) \quad (21\text{ bis})$$

On the rear train the expected vertical loads are:

$$Zp_3 \text{desired}(t) = \frac{M_R g}{2} + \frac{1}{v_2}\left[\frac{K_2 h}{K_1 + K_2 - M_S gh} + \frac{M_R}{M_S}h_2\right]\frac{M_S}{1 + \frac{V^2}{V_c^2}}\frac{V^2}{l_1 + l_2}\alpha_c(t-T) \quad (22)$$

$$Zp_4 \text{desired}(t) = \frac{M_R g}{2} - \frac{1}{v_2}\left[\frac{K_2 h}{K_1 + K_2 - M_S gh} + \frac{M_R}{M_S}h_2\right]\frac{M_S}{1 + \frac{V^2}{V_c^2}}\frac{V^2}{l_1 + l_2}\alpha_c(t-T) \quad (22\text{ bis})$$

Knowing the load on each tire, by linear modeling of the tire (equation 19 bis) the instruction cornering force on each of the four tires can be deduced:

$$Yp_1\text{desired} = -D_1(Zp_1\text{desired})*\delta_F\text{desired}$$

From equations (3), (4), (9) and (10) the desired tire sideslips are:

$$\delta_R\text{desired}(t) = -\frac{\frac{M_R}{D_R}}{1 + \frac{V^2}{V_c^2}}\frac{V^2}{l_1 + l_2}\alpha_c(t) \quad (23)$$

$$\delta_R\text{desired}(t) = -\frac{\frac{M_R}{D_R}}{1 + \frac{V^2}{V_c^2}}\frac{V^2}{l_1 + l_2}\alpha_c(t-T) \quad (24)$$

By using the expressions for the cornering stiffness (19 bis), the desired load (21) and the desired tire sideslip (23), the instruction cornering force is then:

$$Yp_1\text{desired}(t) = \frac{D_{1,0} + A_1\left(Zp_1\text{desired}(t) - \frac{M_R g}{2}\right)}{D_R}\frac{M_F}{1 + \frac{V^2}{V_c^2}}\frac{V^2}{l_1 + l_2}\alpha_c(t) \quad (25)$$

$$Yp_2\text{desired}(t) = \frac{D_{2,0} + A_1\left(Zp_2\text{desired}(t) - \frac{M_F g}{2}\right)}{D_R}\frac{M_F}{1 + \frac{V^2}{V_c^2}}\frac{V^2}{l_1 + l_2}\alpha_c(t) \quad (25\text{bis})$$

Similarly, on the rear axle and taking into account the delay in the cornering force of the rear axle, we have:

$$Yp_3\text{desired}(t) = \frac{D_{3,0} + A_2\left(Zp_3\text{desired}(t) - \frac{M_R g}{2}\right)}{D_R}\frac{M_R}{1 + \frac{V^2}{V_c^2}}\frac{V^2}{l_1 + l_2}\alpha_c(t-T) \quad (26)$$

$$Yp_4\text{desired}(t) = \frac{D_{4,0} + A_2(Zp_4\text{desired}(t) - \frac{M_R g}{2})}{D_R}\frac{M_R}{1 + \frac{V^2}{V_c^2}}\frac{V^2}{l_1 + l_2}\alpha_c(t-T) \quad (26\text{ bis})$$

It is assumed that the cornering forces Y for all the wheels, the variations of the cornering forces Y, and the variations of the angle at the steering wheel can be measured at each instant in time. It is proposed that a path control system be triggered as soon as the difference between the desired forces and the actual measured forces becomes too large. The criterion of stability that is thus proposed expresses the fact that the vehicle remains stable as long as this difference remains small (compromise between the wishes of the driver and the actual conditions).

The advantage of detecting these differences on each wheel is that the system knows more precisely the reason for the loss of control of the vehicle.

A simulation of the dynamic behavior of a vehicle under typical maneuvers is presented with the aid of the following figures. The simulation model that is used is a four-wheeled model with 7 degrees of freedom, enabling the equilibrium of the vehicle to be expressed in terms of yaw, pitch, roll and rotation of the four wheels. The four simulations presented here relate to a vehicle whose characteristics are those of a Volkswagen Golf car travelling at a speed of 90 km/h.

In the first simulation (FIGS. 5*a*–*c*, 6*a*–*d*, and 7*a*–*d*), a sinusoidal pulse of frequency 0.5 Hz of increasing amplitude and on a wet surface is plotted as a steering wheel instruction. This maneuver leads to the loss of control of the vehicle. In all the figures illustrating tire cornering forces (Yp), the axle cornering forces ($Y_F$, $Y_R$), the loads (Zp) or yaw moments (Mz) the continuous curves, denoted by "A", represent the actual values, while the dotted curves, denoted by "D", represent the values desired by the driver.

Figure 5A:
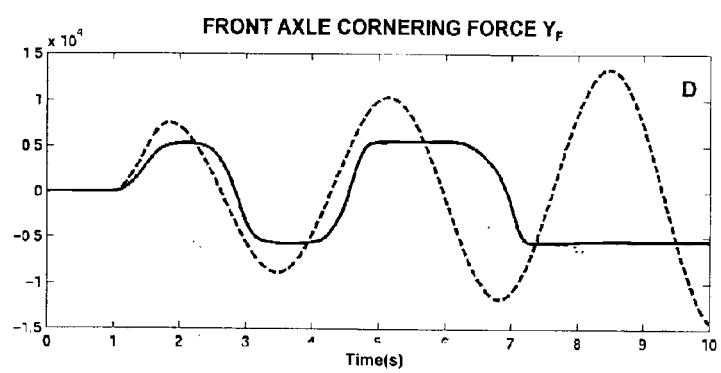
Figure 5B:
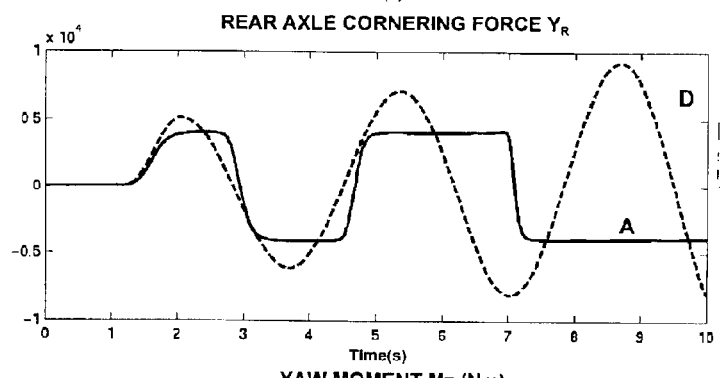
Figure 5C:
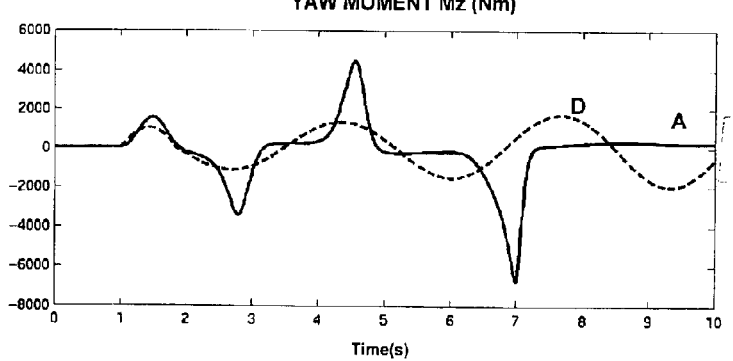
Figure 6A:
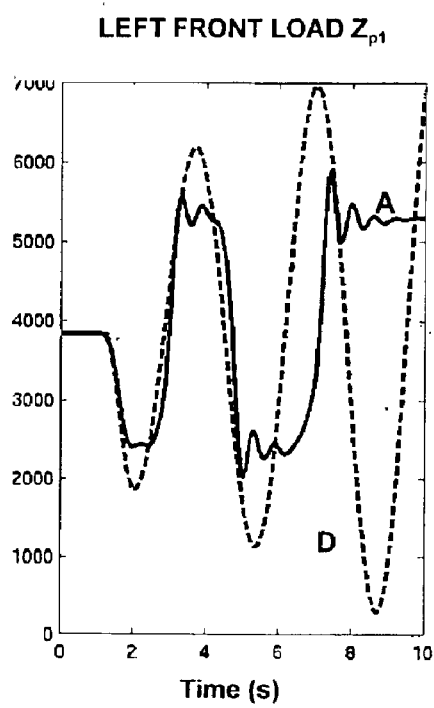
Figure 6B:
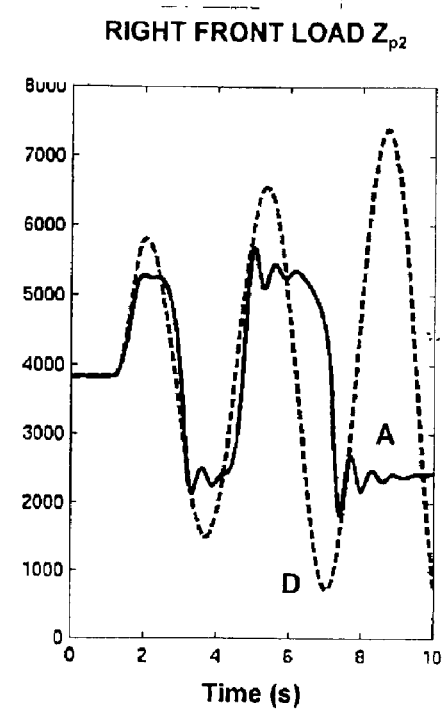
Figure 6C:
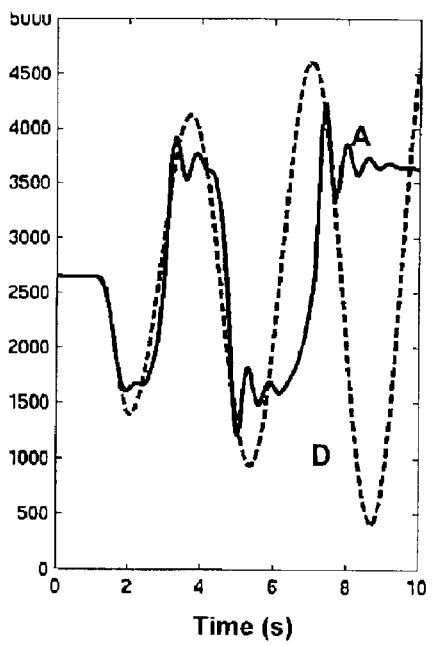
Figure 6D:
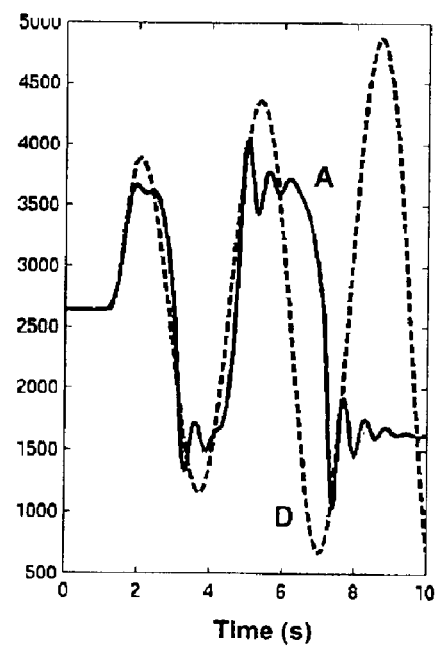

In FIGS. 5*a*, 5*b*, and 5*c* the plotted curves show the difference between the sum of the two cornering forces of a train (front train or rear train according to the indices "F" or "R" of the figures) and the force desired by the driver, in the context of formulae (12), (13) and (14). The saturation of the forces of the tire with respect to the driver's expectations and the phase difference between the actual forces and the expected forces can be noted.

In FIGS. 6*a*, 6*b*, 6*c*, and 6*d* the differences between the actual loads and the loads desired by the driver as expressed by the formulae (21), (21 bis), (22) and (22 bis) can be seen.

In FIGS. 7*a*, 7*b*, 7*c* and 7*d* this loss of control is detected via the saturation of the observed cornering forces of the tires as the difference between the instruction cornering forces expressed by the formulae (25), (25 bis), (26) and (26 bis) and the actual cornering forces. At the same time it is found that the actual forces are delayed with respect to the instruction, illustrating the phase difference between the intervention of the driver and the reactions of the vehicle. In each case the reference "A" represents the actual forces (continuous line) and the reference "D" refers to the instruction expressed by the proposed method (dotted line).

In the second simulation (FIGS. 8a–c, 9a–d, 10a–d, 11 and 12) it is shown how a modification of the front/rear anti-rolling distribution, controlled as explained above, enables the path of the vehicle to be stabilized. The maneuver is identical to the previous maneuver (steering command in the form of an increasing sinusoidal curve on a wet surface at 90 km/h). As soon as excessive yaw forces are detected, the anti-rolling device is reinforced at the front of the vehicle and is reduced by the same amount at the rear so as to make the vehicle stable as quickly as possible and to utilize in the best possible way the gripping potential of the four tires. The saturation of the cornering forces is better controlled and permits smaller phase differences, which means that yaw moments are better handled and vehicle body changes are more readily identified. To reiterate, in each case the reference "A" represents the actual forces (continuous curve) and the reference "D" refers to the instruction expressed by the proposed method (dotted curve).

Figure 8A:
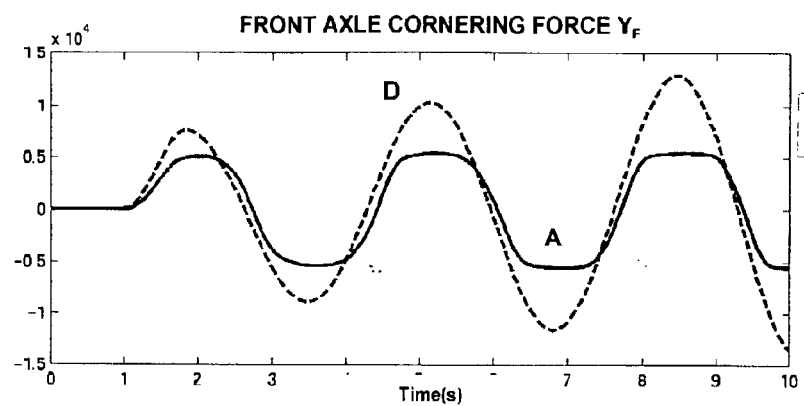
Figure 8B:
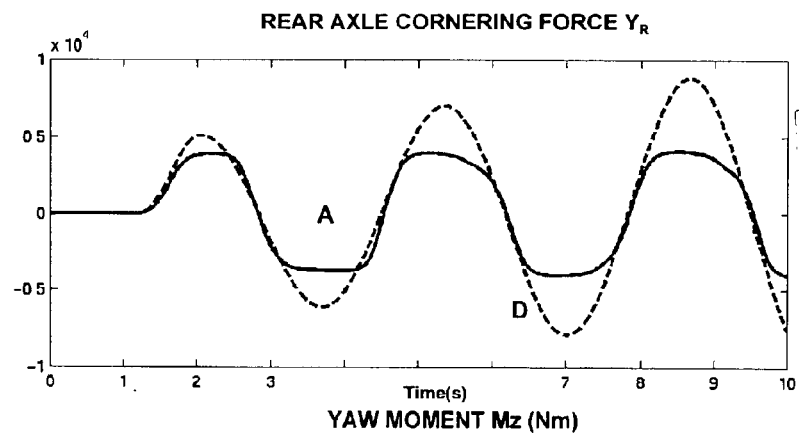
Figure 8C:
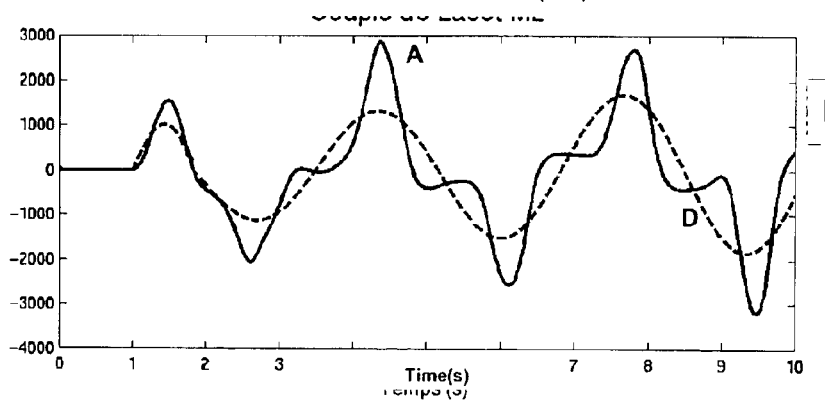
Figure 9A:
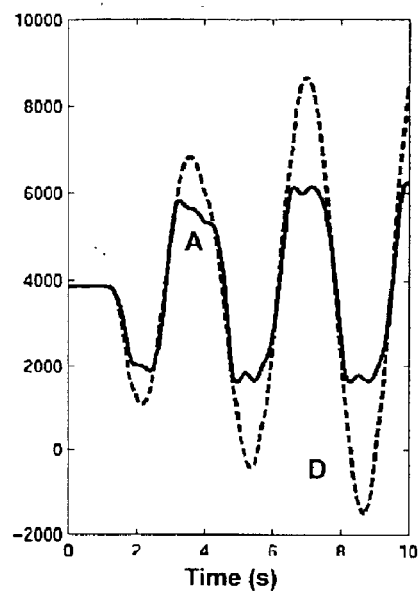
Figure 9B:
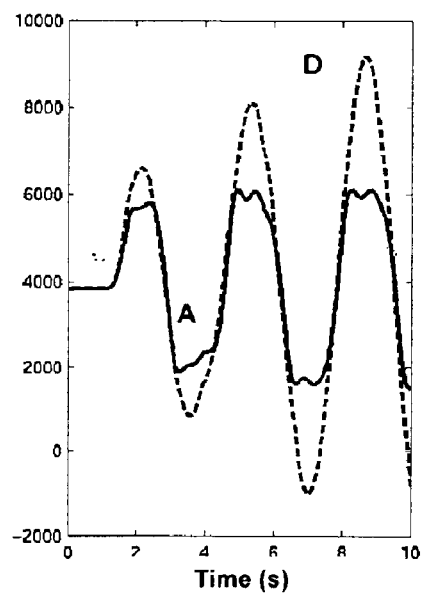
Figure 9C:
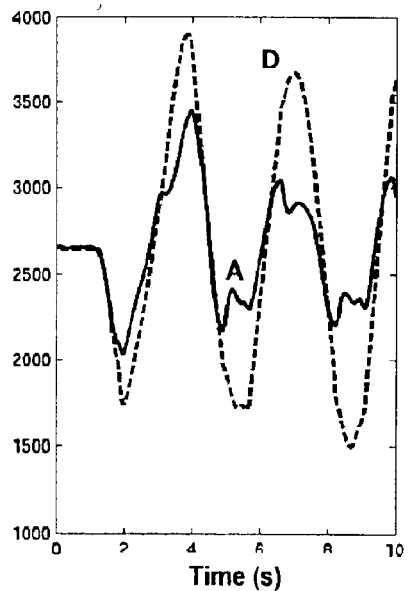
Figure 9D:
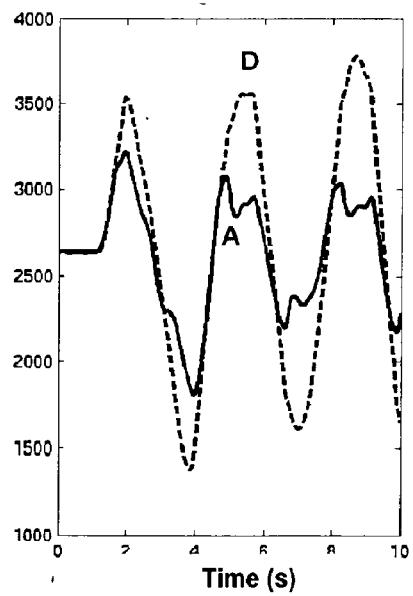
Figure 10A:
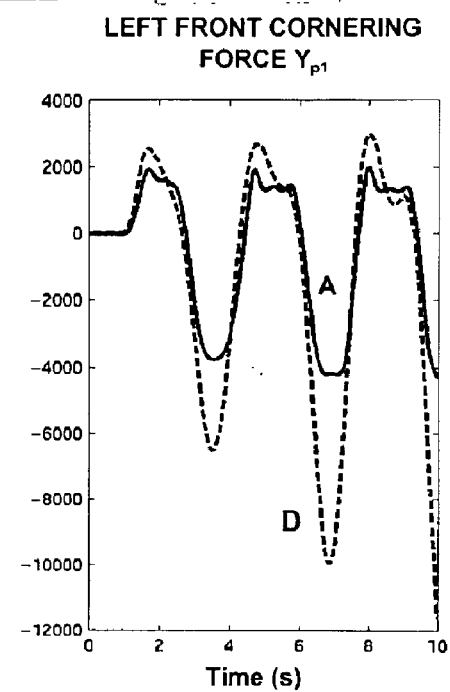
Figure 10B:
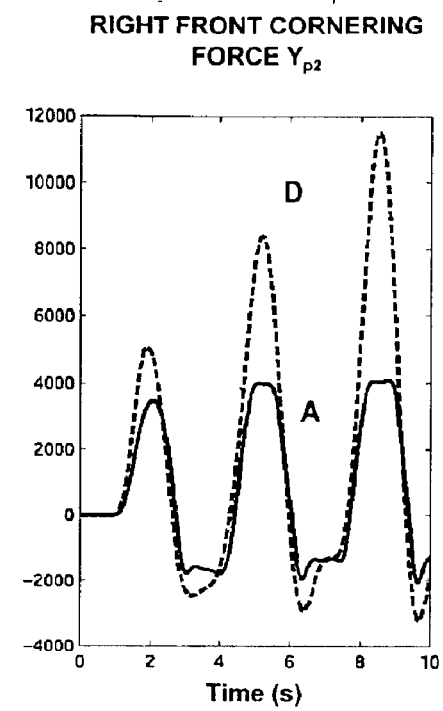
Figure 10C:
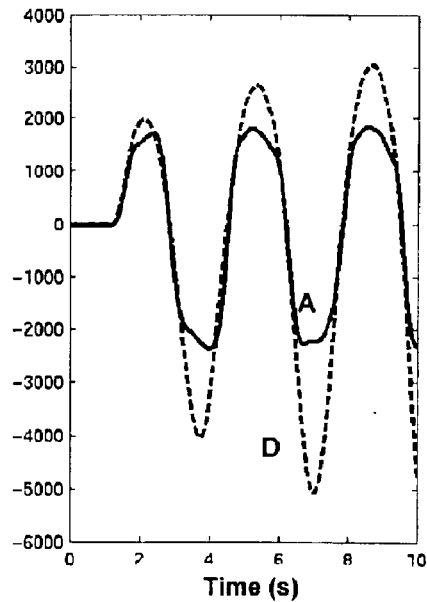
Figure 10D:
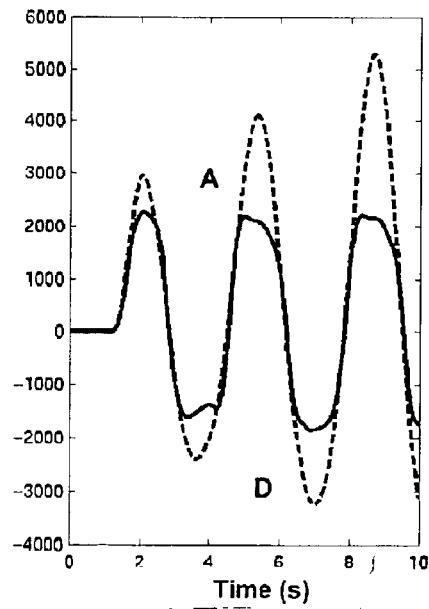

FIGS. 8a, 8b, and 8c show the actual and desired cornering forces of the front axle, the rear axle, and the yaw moment of the vehicle. FIGS. 9a, 9b, 9c, and 9d show the actual and desired vertical loads Zp on the four tires. FIGS. 10a, 10b, 10c, and 10d show the actual and desired lateral cornering forces Yp on the four tires.

Although the anti-rolling dynamic distribution does not enable the saturation of the tire to be avoided completely under the existing gripping conditions, it nevertheless enables the error signal to be minimized and the delay between the commands of the driver and the responses of the vehicle to be reduced (FIGS. 9a–d, 10a–d).

Figure 11:
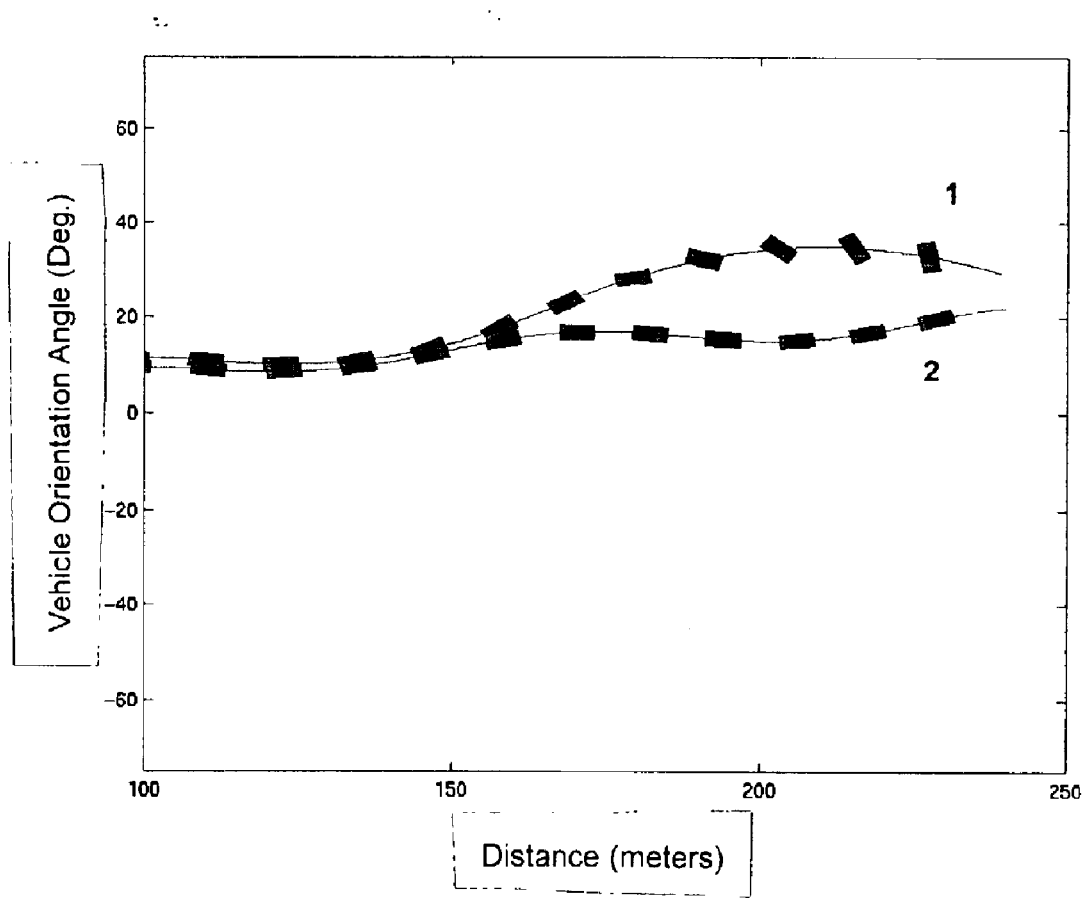
FIG. 11 illustrates the differences of path between a vehicle with control (reference numeral 2) of the anti-rolling distribution and a vehicle without control of the anti-rolling distribution (reference numeral 1) in a maneuver involving a steering command in the form of an increasing sinusoidal curve, on a wet surface at 90 km/hour.

FIG. 11 symbolizes the vehicle (represented by a rectangle) on the aforedescribed path by its center of gravity (shown as a continuous line). In this representation the alignment of the vehicle is shown via the angle that the vehicle makes with the path. The phase difference between the actual alignment of the vehicle and the desired path may be observed by recording, in specific successive positions illustrated in FIG. 11, the more or less large angle between the orientation of the vehicle and the tangent to the path at the center of gravity of the vehicle until loss of control of the vehicle supervenes due to oversteering.

This loss of control may be anticipated by the difference between the desired yaw moment and the actual yaw moment. The actual yaw moment is much too large and causes the vehicle to swerve, as is shown by the path (FIG. 11). By making the driver's instructions responsive to the forces, such as described by the proposed method, the vehicle remains stable and follows the path desired by the driver (reference numeral 2, FIG. 11).

Figure 12:
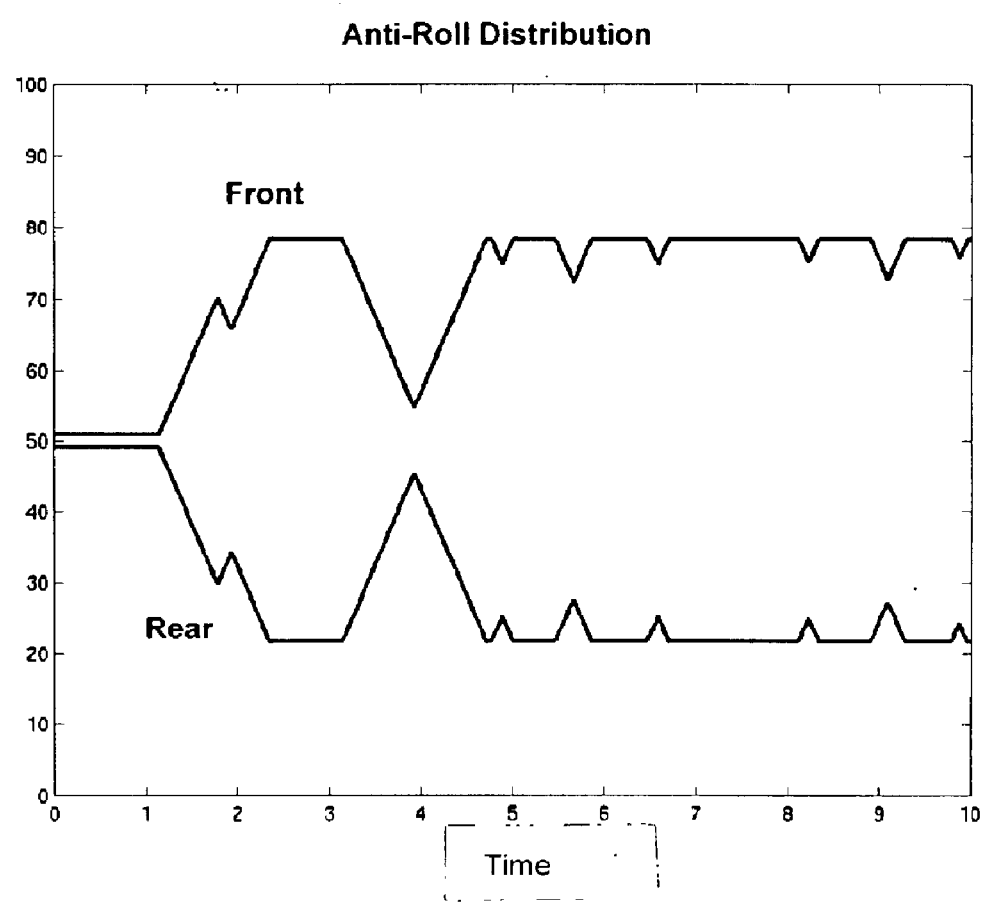
FIG. 12 illustrates the anti-rolling distribution in order to stabilize the vehicle.
Figure 14A:
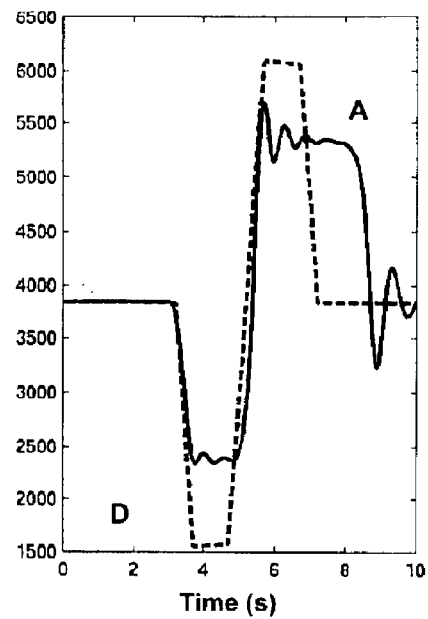
Figure 14B:
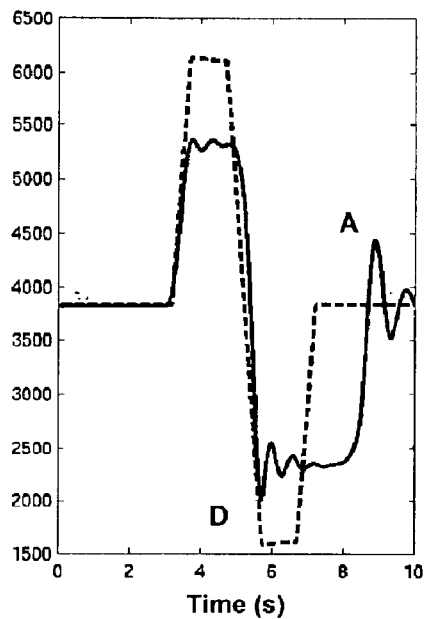
Figure 14C:
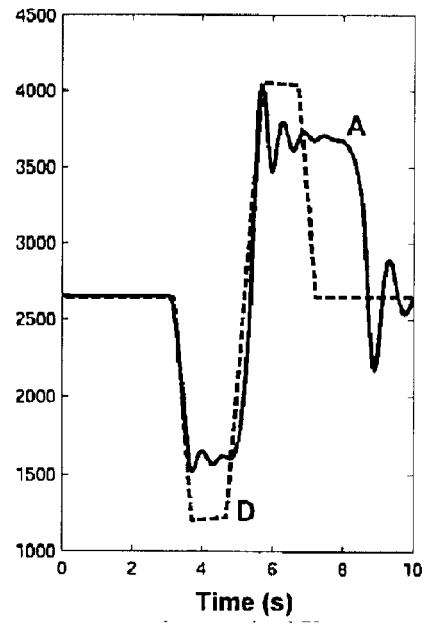
Figure 14D:
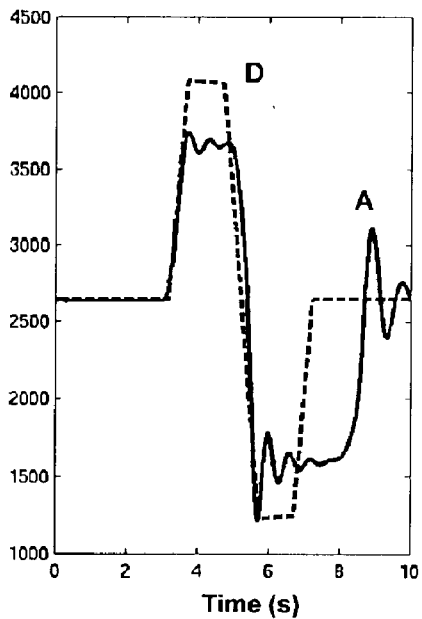
Figure 15A:
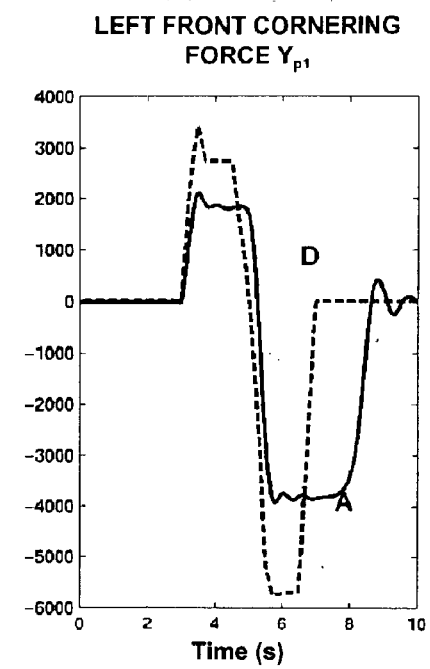
Figure 15B:
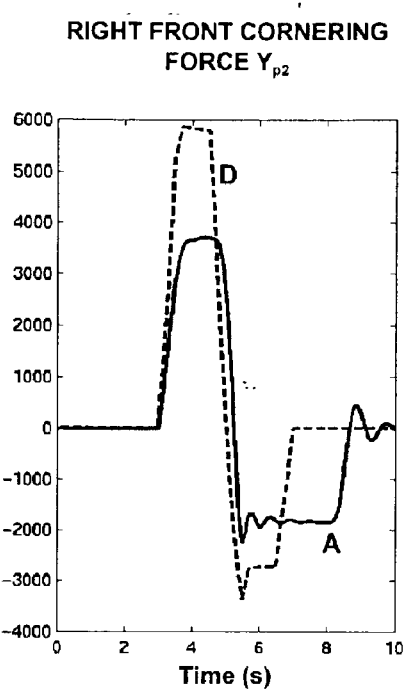
Figure 15C:
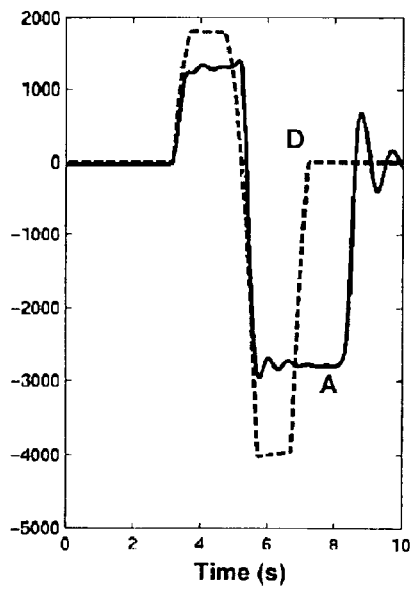
Figure 15D:
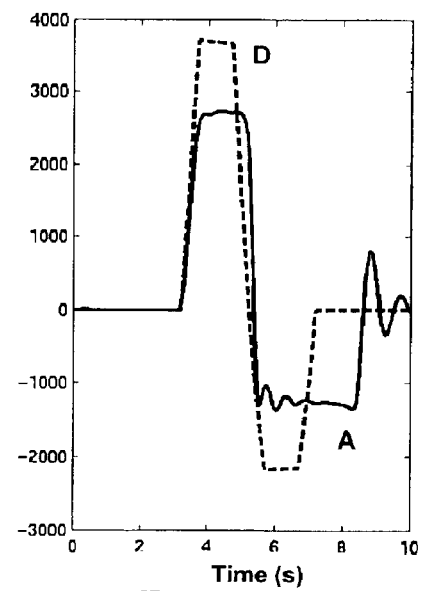

FIG. 12 illustrates the anti-rolling distribution in order to stabilize the vehicle. If a saturation is observed, an anti-roll force is exerted on the rear axle in order to increase the front anti-roll while maintaining constant the overall anti-roll stiffness. This change in distribution of the loads stabilizes the vehicle by causing it to understeer more.

In the third simulation (FIGS. 13a–c, 14a–d, and 15a–d), the driver changes lane on a wet road surface and loses control of the vehicle. In each case the reference "A" represents the actual forces (continuous line) and the reference "D" refers to the instruction expressed by the proposed method (dotted line). FIGS. 13a–c show the actual and desired cornering forces of the front axle, rear axle, and the yaw moment of the vehicle.

In FIGS. 13a–c it can be seen that the saturation of the cornering forces of the front and rear axles and the cornering force delay of the rear axle lead to loss of control of the vehicle and to swerving. This swerving is also illustrated via the overload in the yaw moment with respect to the yaw moment desired by the driver. The loss of control of the vehicle may be detected wheel by wheel by measuring the difference between the instruction cornering forces (described by the formulae (25), (25 bis), (26) and (26 bis)) and the actual cornering forces or the difference between the instruction loads (described by the formulae (21), (21 bis), (22) and (22 bis)) and the actual loads. FIGS. 14a, 14b, 14c, and 14d show the actual and desired vertical loads Zp on the four tires. FIGS. 15a, 15b, 15c, and 15d represent the actual and desired lateral cornering forces Yp on the four tires.

Figure 16A:
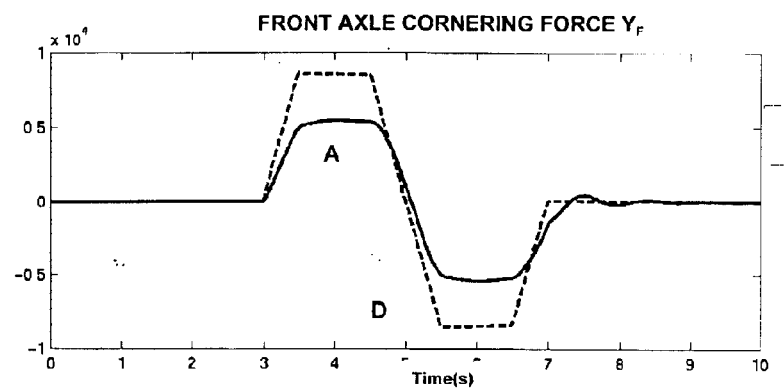
Figure 16B:
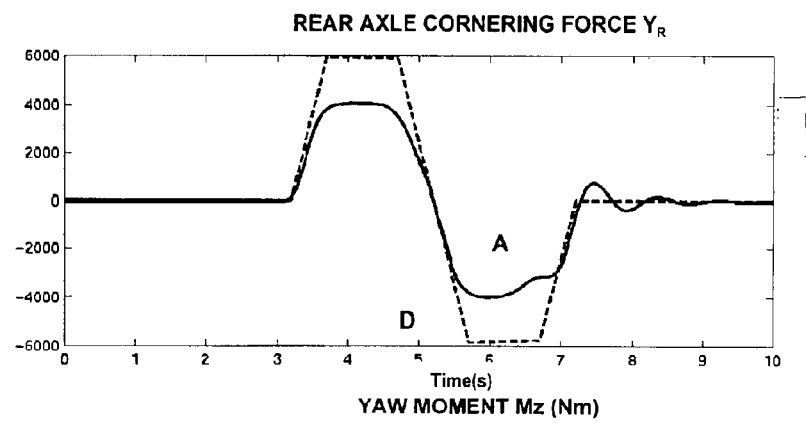
Figure 16C:
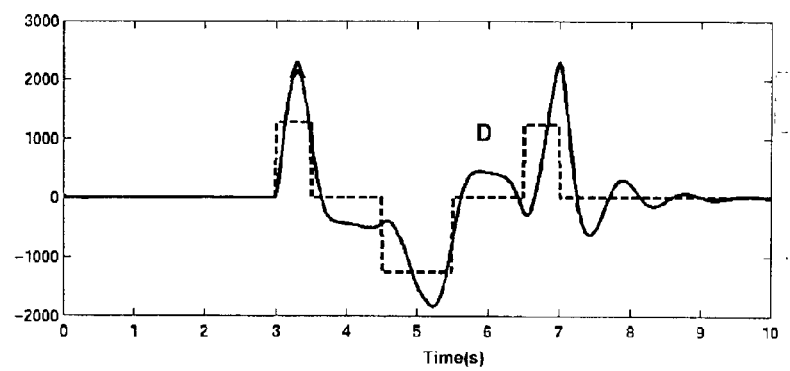
Figure 17A:
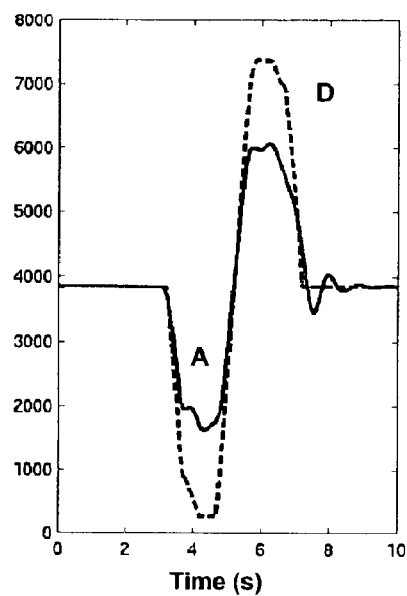
Figure 17B:
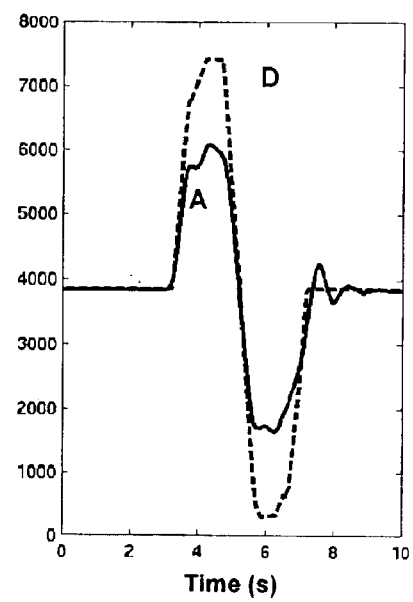
Figure 17C:
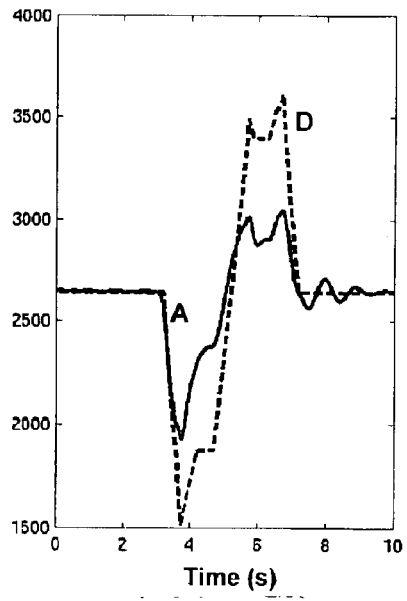
Figure 17D:
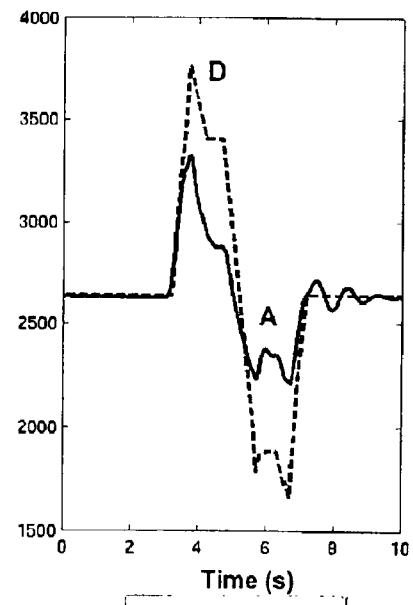
Figure 19:
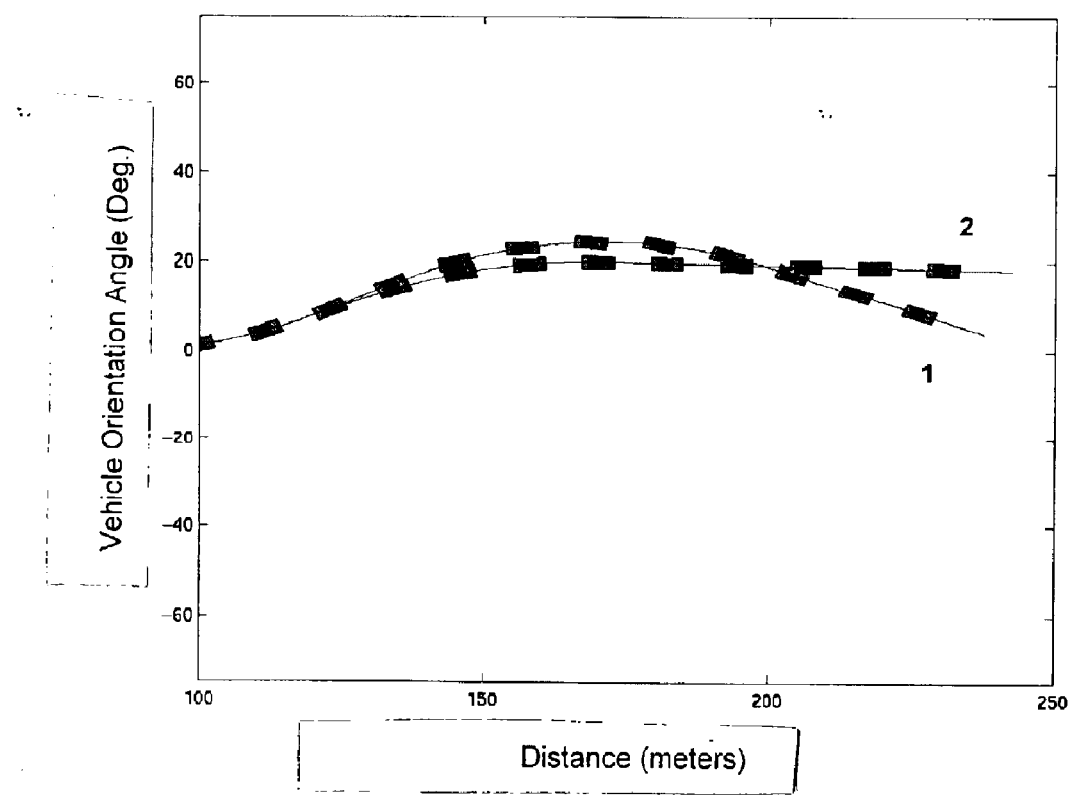
FIG. 19 illustrates the path differences between a vehicle with control (reference numeral 2) of the anti-rolling distribution and a vehicle without control of the anti-rolling distribution (reference numeral 1), in this avoidance maneuver, on a wet surface, at 90 km/hour.

The fourth simulation (FIGS. 16a–c, 17a–d, 18a–d, 19 and 20) shows how a modification of the front/rear anti-rolling distribution, controlled as explained hereinbefore, enables the path of the vehicle to be stabilized. In each case the reference "A" represents the actual forces (continuous line) and the reference "D" refers to the instruction expressed by the proposed method (dotted line). The maneuver is identical to the preceding maneuver (avoidance maneuver on a wet surface at 90 km/hour). As soon as excessive yaw forces are detected the anti-roll device is reinforced at the front of the vehicle and decreased by the same amount at the rear of the vehicle so as to stabilize the vehicle as quickly as possible and to utilize in the best possible way the gripping potential of the four tires. The saturation of the cornering forces is handled more effectively and permits smaller phase differences, which means that yaw moments are better controlled and movements of the vehicle body are more easily identified. By means of the anti-roll dynamic distribution the system reduces the delay between the driver's instructions to exert the necessary forces and the reaction of the vehicle, and avoids the swerving that is observed in the absence of the system. FIGS. 16a, 16b, and 16c show the actual and desired cornering forces of the front axle, rear axle, and the yaw moment of the vehicle. FIGS. 17a, 17b, 17c, and 17d show the actual and desired vertical loads Zp on the four tires. FIGS. 18a, 18b, 18c, and 18d show the actual and desired lateral cornering forces Yp on the four tires.

The swerving observed when the vehicle is out of control (FIG. 19, reference numeral 1) is restricted in the presence of the anti-roll control device (FIG. 19, reference numeral 2), which is reflected in an alignment of the vehicle parallel to the path of the center of gravity (continuous line).

Figure 20:
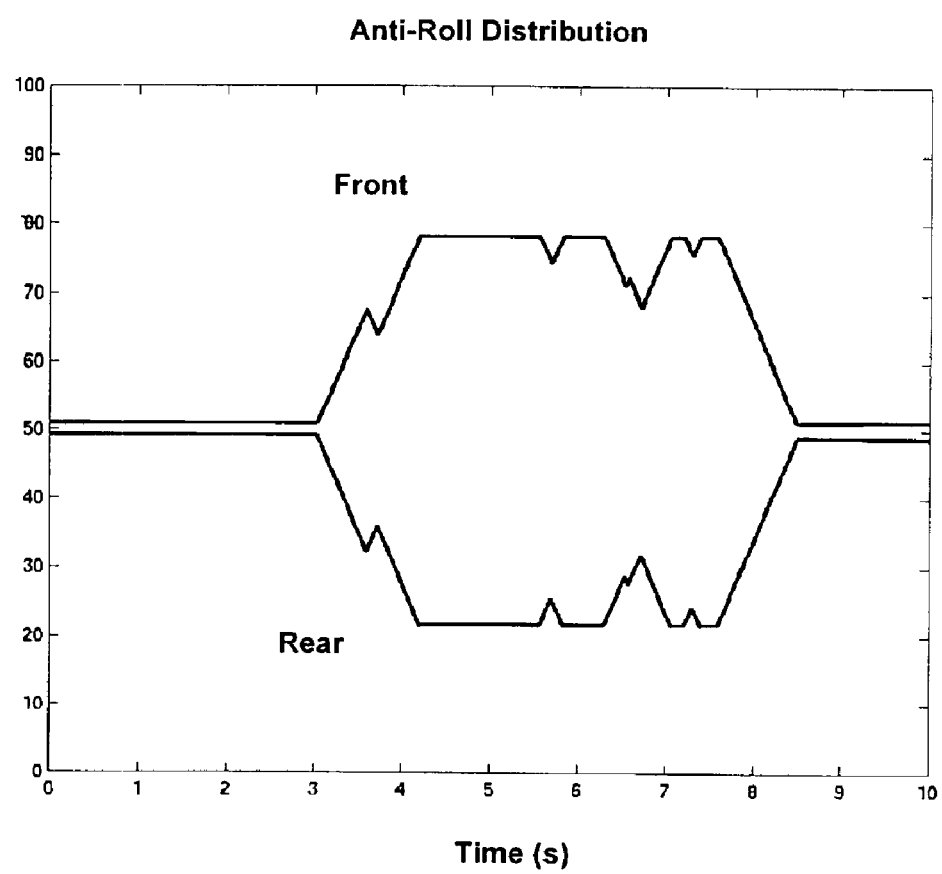
FIG. 20 illustrates the anti-rolling distribution in order to stabilize the vehicle.

FIG. 20 illustrates the anti-rolling distribution in order to stabilize the vehicle. If a saturation is observed, an anti-roll force is exerted on the rear axle in order to increase the front anti-roll while maintaining constant the overall anti-roll stiffness. This change in distribution of the loads stabilizes the vehicle by causing it to understeer more.

What is claimed is:

1. A method for controlling the stability of a vehicle, the vehicle comprising a body and at least one front ground contacting arrangement and at least one rear ground contacting arrangement, each ground contacting arrangement comprising in each case a wheel, each wheel comprising a tire in contact with the ground, the vehicle having a characteristic time that is a function of its inertia and corresponds to the time phase shift in the manifestation of the cornering forces on the wheels in the front and in the rear, following a command from the driver of the vehicle, the vehicle being provided with operating means to act on the forces transmitted to the ground by each of the wheels, the method comprising the steps of:
   (a) measuring in real time an actual value of one of a cornering force "Y" and a vertical load "Z" acting at the center of each of the front and rear wheels;
   (b) calculating in real time a desired value of at least one reference parameter, said at least one reference parameter being correlatable to the actual value, as a result of an action of the driver on the operating means and taking into account the characteristic time;
   (c) comparing said desired value of the reference parameter of step (b) to the actual value to determine whether the actual value is compatible with the desired value of the reference parameter; and
   (d) if the comparison of step (c) indicates that the actual value is not compatible, acting on the operating means to bring the actual value into substantial compatibility with the desired value of the reference parameter.

2. A method according to claim 1, wherein said variable is the cornering force "Y" and said desired value of at least one reference parameter of step (b) is the desired cornering force "$Y_{desired}$" at the center of each wheel.

3. A method according to claim 2, wherein step (c) further comprises generating an error signal representative of the magnitude and direction of the difference between the actual cornering force "Y" and the desired cornering force "$Y_d$"; and step (d) comprises controlling said operating means to minimize said error signal.

4. A method according to claim 1 wherein said variable is the cornering force "Y", said operating means including a command for controlling the steering, and wherein step (a) comprises calculating in real time an effective yaw moment corresponding to the actual cornering forces "Y" at the center of each wheel, and said desired value of at least one reference parameter of step (b) is a desired yaw moment, the method comprising measuring in real time a signal at the steering command and calculating a desired yaw moment "$M_d$"; and step (c) comprises comparing said desired yaw moment "$M_d$" with the effective yaw moment of step (a).

5. A method according to claim 4, wherein step (c) further comprises generating an error signal representative of the magnitude and the direction of the difference between the effective yaw moment and the desired yaw moment "$M_d$"; and step (d) comprises controlling said operating means to minimize said error signal.

6. Method for controlling the stability of a vehicle according to claim 1, wherein said variable is the vertical load "Z".

7. A method according to claim 6 wherein said operating means includes a command for controlling the steering, and wherein said desired value of at least one reference parameter of step (b) is the desired load "$Z_d$" at the center of each of wheels, the method including measuring in real time a signal at the steering command and calculating the desired loads "$Z_d$".

8. A method according to claim 7, wherein step (c) further comprises generating an error signal representative of the magnitude and the direction of the difference between the actual loads "Z" and the desired loads "$Z_d$"; and step (d) comprises controlling said operating means to minimize said error signal.

9. A method according to claim 1, wherein each ground contacting arrangement comprises a vertical suspension device allowing clearance of the wheel with respect to the body, first anti-roll control means acting between the wheels of the front axle, second anti-roll control means acting between the wheels of the rear axle, and wherein the step of acting on the operating means comprises dynamically modifying the distribution between the front axle and rear axle of the anti-roll device to maintain a constant overall anti-roll force, being one of a contribution of the rear anti-roll device being reduced to decrease the yaw moment exerted by the wheels on the vehicle and a contribution of the rear anti-roll device being increased to increase the yaw moment exerted by the wheels on the vehicle, to reduce the error signal.

10. A method according to claim 1, wherein the vehicle has at least one axle comprising supplementary means for steering the wheels of at least one axle, the means acting independently of the steering control device, wherein the step of acting on the operating means comprises dynamically controlling the supplementary steering means to modify the yaw moment exerted on the vehicle by the wheels to reduce the error signal.

11. A method according to claim 1, wherein the vehicle comprises means for applying a braking torque selectively to each of the wheels, wherein the step of acting on the operating means comprises exerting one of a braking action on at least one of the wheels outside the steering action effected by the vehicle to reduce the yaw moment exerted by the wheels on the vehicle and a braking action on at least one of the wheels inside the steering action effected by the vehicle to increase the yaw moment exerted by the wheels on the vehicle to reduce the error signal.

12. A vehicle stability control system, the vehicle comprising a body and at least one front ground contacting arrangement and at least one rear ground contacting arrangement, each ground contacting arrangement comprising a wheel, each wheel comprising a tire in contact with the ground, the vehicle having a characteristic time that is a function of its inertia and corresponds to the time phase shift in the manifestation of the cornering forces on the wheels in the front and in the rear, following a command from the driver of the vehicle, the vehicle being provided with operating means to act on the forces transmitted to the ground by each of the wheels, the system comprising:
   (a) means for measuring in real time actual values of one of a cornering force "Y" and a vertical load "Z" acting at the center of each of the front and rear wheels;
   (b) a controller for calculating in real time, as a result of an action of the driver on the operating means and taking into account the characteristic time, desired values of at least one reference parameter, said at least one reference parameter being correlatable to the actual values, said controller also for comparing the desired values with the measured actual values in order to obtain an error signal; and,
   (c) means for acting on the operating means to minimize the error signal.

13. A vehicle stability control system according to claim 12, wherein said means for measuring measures actual values of the cornering force "Y" and the controller calculates a desired cornering force "$Y_d$" at the center of each wheel.

14. A vehicle stability control system according to claim 12, wherein said means for measuring measures the cornering force "Y" and the controller calculates a desired yaw moment "$M_d$", said operating means including a command for operating the steering, the system further comprising:
   means for sensing in real time a signal in the steering command;
   said controller including means to calculate in real time an effective yaw moment according to said cornering forces "Y" and to calculate the desired yaw moment "$M_d$" according to the signal in the steering command, the controller allowing to compare the effective and desired yaw moments in order to obtain said error signal.

15. A vehicle stability control system according to claim 12, wherein said means for measuring measures the actual vertical load "Z" and wherein the controller calculates the desired vertical load "$Z_d$".

16. A vehicle stability control system according to claim 15, wherein said operating means includes a command for operating the steering, the system further comprising means for sensing in real time a signal in the steering command, and wherein said controller calculates in real time the actual vertical load "Z" and calculates the desired vertical load "$Z_d$" according to the signal in the steering command, the controller compares the effective and desired vertical loads to obtain said error signal.

17. A vehicle stability control system according to claim 12, wherein each ground contacting arrangement comprises a vertical suspension device allowing clearance of the wheel with respect to the body, first anti-roll control means acting between the wheels of the front axle, second anti-roll control means acting between the wheels of the rear axle, wherein said means for acting on the operating means comprises means for dynamically modifying a distribution between the front axle and rear axle of the anti-roll device so as to maintain a constant overall anti-roll force, wherein a contribution of the rear anti-roll device is decreased to decrease the yaw moment exerted by the wheels on the vehicle and increased to increase the yaw moment exerted by the wheels on the vehicle, to reduce the error signal.

18. A vehicle stability control system according to claim 12, wherein the vehicle has at least one axle comprising supplementary means for steering the wheels of at least one axle, said means acting independently of the steering control device, wherein said means for acting on the operating means comprises a controller for dynamically controlling the supplementary steering means to modify the yaw moment exerted on the vehicle by the wheels in order to reduce the error signal.

19. A vehicle stability control system according to claim 12, wherein the vehicle comprises means for applying a braking torque selectively to each of the wheels, and wherein said means for acting on the operating means comprises means for selectively exerting a braking action on at least one of the wheels outside the steering action effected by the vehicle in order to reduce the yaw moment exerted by the wheels on the vehicle, and exerting a braking action on at least one of the wheels inside the steering action effected by the vehicle in order to increase the yaw moment exerted by the wheels on the vehicle, to reduce the error signal.

* * * * *